(12) United States Patent
Uenishi

(10) Patent No.: US 9,264,600 B2
(45) Date of Patent: Feb. 16, 2016

(54) FOCUS ADJUSTMENT APPARATUS AND FOCUS ADJUSTMENT METHOD

(75) Inventor: Masaaki Uenishi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 920 days.

(21) Appl. No.: 12/704,744

(22) Filed: Feb. 12, 2010

(65) Prior Publication Data

US 2010/0208126 A1 Aug. 19, 2010

(30) Foreign Application Priority Data

Feb. 17, 2009 (JP) ................................ 2009-034032

(51) Int. Cl.
*H04N 5/232* (2006.01)
(52) U.S. Cl.
CPC ................ *H04N 5/23212* (2013.01)
(58) Field of Classification Search
CPC ........... H04N 5/23212; H04N 5/23209; G03B 13/36; G02B 7/38
USPC ................. 348/345, 349, 353, 356
See application file for complete search history.

(56) References Cited

U.S. PATENT DOCUMENTS

| | | | |
|---|---|---|---|
| 6,727,949 B1 * | 4/2004 | Saruwatari et al. | 348/349 |
| 7,796,182 B2 * | 9/2010 | Konishi | 348/345 |
| 8,078,046 B2 * | 12/2011 | Inoue | 396/121 |
| 2003/0117517 A1 * | 6/2003 | Ogino | 348/356 |
| 2003/0160874 A1 * | 8/2003 | Kuroiwa | 348/220.1 |
| 2004/0051029 A1 * | 3/2004 | Hirai | 250/201.2 |
| 2006/0238641 A1 * | 10/2006 | Konishi | 348/349 |

FOREIGN PATENT DOCUMENTS

| | | |
|---|---|---|
| CN | 1856021 A | 11/2006 |
| CN | 101170649 A | 4/2008 |
| JP | H02-109008 A | 4/1990 |
| JP | 2003-107331 A | 4/2003 |
| JP | 2003-295040 A | 10/2003 |
| JP | 2004-109150 A | 4/2004 |
| JP | 2005-141068A A | 6/2005 |
| JP | 2006-208558 A | 8/2006 |
| JP | 4106485 B2 | 6/2008 |
| JP | 2008-176152A A | 7/2008 |

OTHER PUBLICATIONS

Terayama, Kimita, Automatic Focusing Device, Automatic Focusing Method, and Control Program Readable by Computer, Publication #JP2005-141068, Feb. 6, 2005, Machine Translation (Abstract, Detailed Description, and Drawings).*

* cited by examiner

*Primary Examiner* — Twyler Haskins
*Assistant Examiner* — Carramah J Quiett
(74) *Attorney, Agent, or Firm* — Canon USA, Inc. IP Division

(57) ABSTRACT

Before receiving an instruction, an apparatus identifies an object region to be focused by detecting a focus signal while moving a focusing lens. When the instruction is received, the apparatus moves the focusing lens based on the focus signal of the identified object region to be focused to detect a focus signal and perform a focus adjustment for the focusing lens.

14 Claims, 26 Drawing Sheets

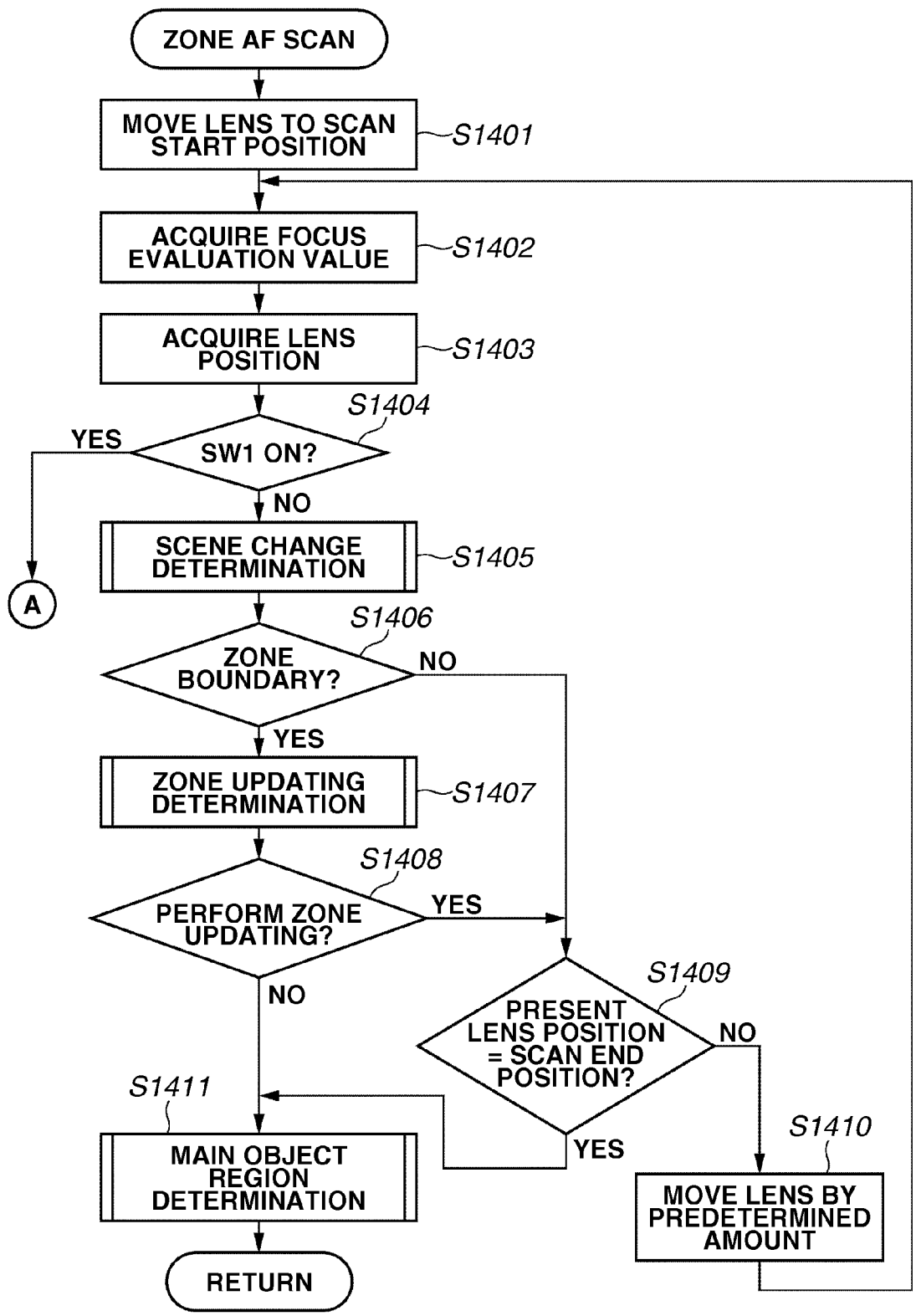

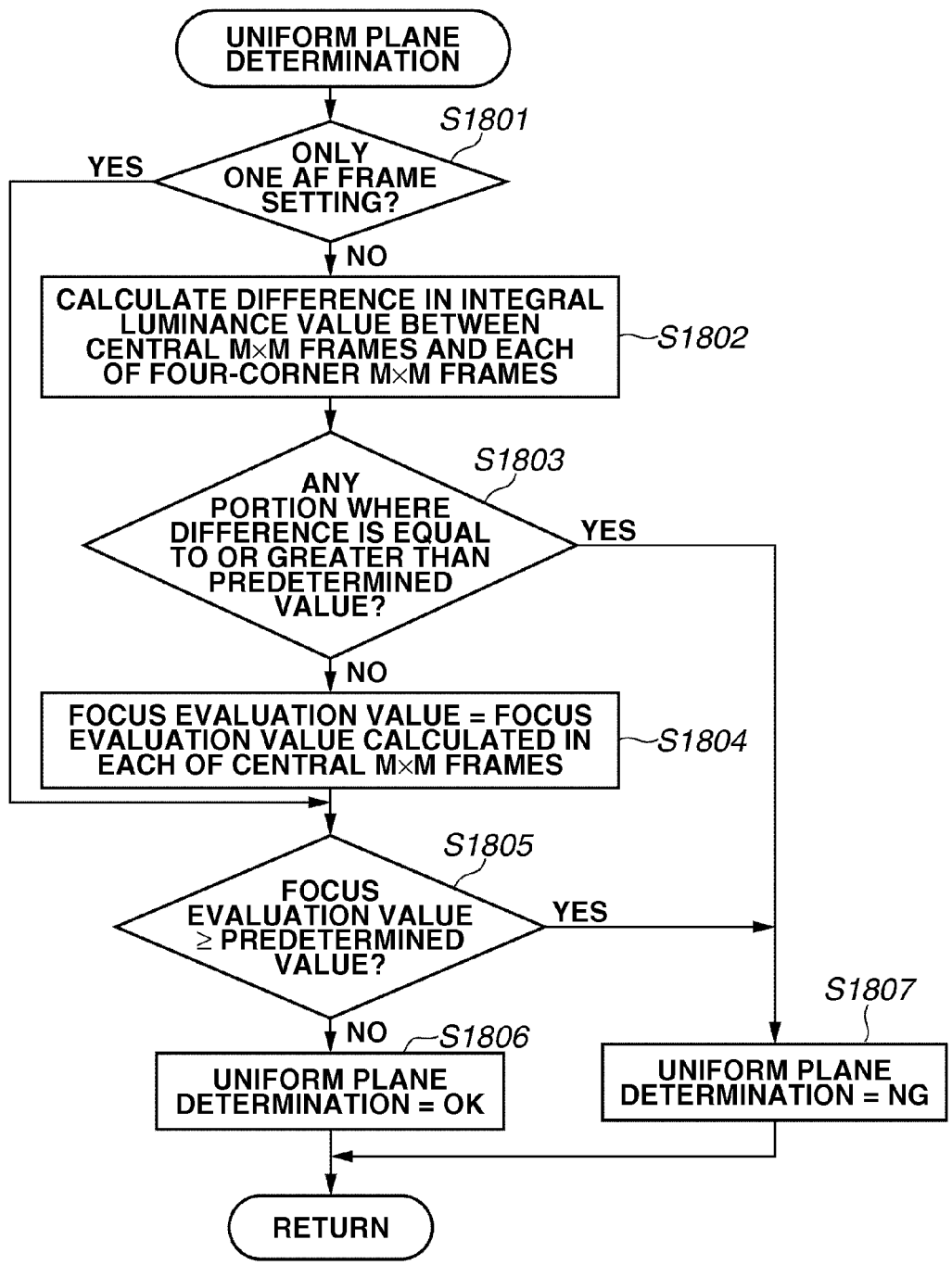

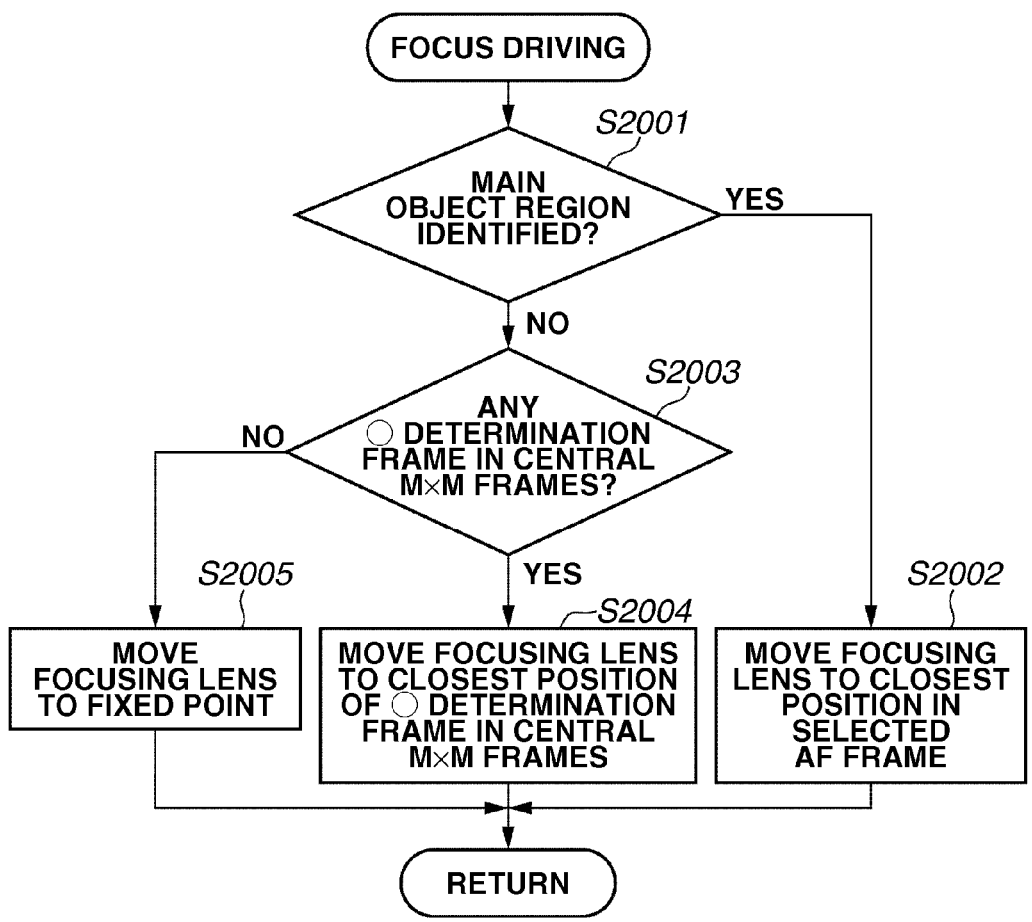

FOCUS ADJUSTMENT APPARATUS AND FOCUS ADJUSTMENT METHOD

BACKGROUND OF THE INVENTION

1. Field of the Invention

The present invention relates to a focus adjustment apparatus and a focus adjustment method. More specifically, the present invention relates to an automatic focusing technique.

2. Description of the Related Art

According to a conventional method, an electronic still camera (or video camera) can perform automatic focusing (hereinafter, referred to as "AF") processing by setting an in-focus position to a lens position where a high frequency component of a luminance signal obtained from an image sensor using a charge coupled device (CCD) can be maximized.

A conventional scan method includes storing a focus evaluation value based on a high frequency component of a luminance signal obtained from the image sensor while driving the lens in each scanning and designating a lens position corresponding to a maximum value of the stored value as an in-focus position.

As another method, a hill-climbing (hereinafter, referred to as "continuous AF") method includes moving a lens in a predetermined direction so as to increase the focus evaluation value and designating a position where the focus evaluation value can be maximized as an in-focus position.

As discussed in Japanese Patent No. 04106485, the time consumed for an AF operation can be reduced by performing the continuous AF processing so as to keep an in-focus state before instructing preparation for a shooting operation, because a moving range of the focusing lens in an AF scan operation to be performed in response to the shooting preparation instruction can be reduced effectively.

In the above-described continuous AF processing, if the lens is moved in the predetermined direction to increase the focus evaluation value, an object to be photographed may not be quickly focused in a case where a region to be focused on the image plane is not identified.

According to the method discussed in Japanese Patent No. 04106485, the continuous AF processing is performed in combination with the scan processing to quickly accomplish the focusing operation. However, in this case, a target object to be focused (hereinafter, referred to as a "main object") is not identified on the image plane to be focused by a user. Therefore, there may be a shooting scene in which the main object cannot be focused.

SUMMARY OF THE INVENTION

According to an aspect of the present invention, an apparatus includes a reception unit configured to receive an instruction; an imaging unit configured to capture an image of an object, which is input via a focusing lens, and to output image data; a setting unit configured to set a focus detection region to detect a focusing state of the focusing lens; and a focus adjustment unit configured to detect a focus signal in the set focus detection region while moving the focusing lens, and configured to move the focusing lens based on the focus signal and a focusing lens position. The focus adjustment unit is configured to identify an object region to be focused by detecting the focus signal while moving the focusing lens before the reception unit receives the instruction, and after the reception unit has received the instruction, perform a focus adjustment operation for the focusing lens by detecting the focus signal while moving the focusing lens based on information relating to the identified object region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a flowchart illustrating a subroutine relating to zone AF scan processing illustrated in FIG. 8 according to an exemplary embodiment of the present invention.

FIG. 18 is a flowchart illustrating a subroutine relating to uniform plane determination processing illustrated in FIG. 17 according to an exemplary embodiment of the present invention.

FIG. 20 is a flowchart illustrating a subroutine relating to focusing driving processing illustrated in FIG. 8 according to an exemplary embodiment of the present invention.

DESCRIPTION OF THE EMBODIMENTS

Various exemplary embodiments, features, and aspects of the invention will be described in detail below with reference to the drawings.

Figure 1:
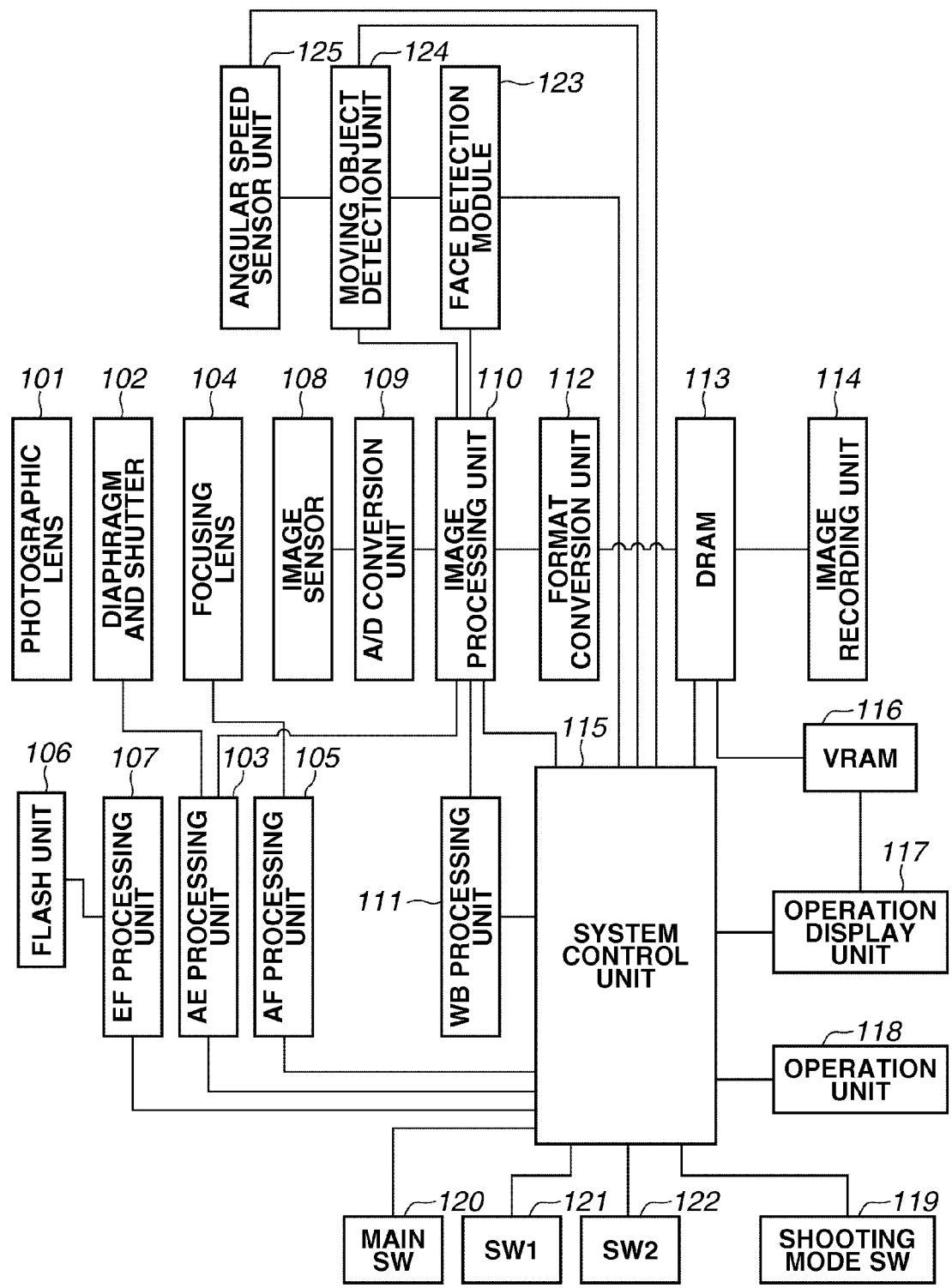
FIG. 1 is a block diagram illustrating a configuration of an electronic camera according to an exemplary embodiment of the present invention.

FIG. 1 is a block diagram illustrating a configuration of an electronic camera according to an exemplary embodiment of the present invention.

The electronic camera includes a photographic lens 101 that includes a zooming mechanism, a diaphragm/shutter 102 that can control the quantity of light, and an AE processing unit 103. The electronic camera further includes a focusing lens 104 that can form an image of an object to be photographed on a below-described image sensor, an AF processing unit 105, a flash unit 106, and an electronic flash (EF) processing unit 107.

The electronic camera further includes an image sensor 108, which can receive reflection light from the object to be photographed and output an electric signal through photoelectric conversion. The electronic camera further includes an A/D conversion unit 109 that includes a CDS circuit that can remove noise components from the output of the image sensor 108 and a non-linear amplification circuit that can perform amplification processing as pre-A/D conversion processing.

The electronic camera further includes an image processing unit 110, a white balance (WB) processing unit 111, a format conversion unit 112, and a high-speed built-in memory (such as a random access memory, hereinafter, referred to as "DRAM") 113. The electronic camera further includes an image recording unit 114 that includes a storage medium (e.g., a memory card) and its interface, a system control unit (hereinafter, referred to as "CPU") 115 that can perform a system control including a shooting sequence, and an image display memory (hereinafter, referred to as "VRAM") 116.

The electronic camera further includes an operation display unit 117 that can perform various display processing (e.g., image display, operational aid display, camera state display, shooting image plane display, and AF region display), an operation unit 118 that enables users to operate the camera, and a shooting mode switch 119 that enables users to perform shooting mode settings (including ON/OFF switching of face detection mode).

The electronic camera further includes a main switch 120 that can be pressed to turn on a system power source, a first switch (hereinafter, referred to as "SW1") 121 that enables users to instruct the camera to start shooting preparation (e.g., AF and AE processing), and a second switch (hereinafter, referred to as "SW2") 122 that serves as a shooting switch to be pressed after the first SW1 is pressed to instruct the camera to start a shooting operation.

The electronic camera further includes a face detection module 123 that can perform face detection processing based on an image signal processed by the image processing unit 110 and can transmit one or more pieces of detected face information (e.g., position, size, and reliability) to the CPU 115. The face detection method is not relevant to the present invention and is, therefore, not described below in detail.

The electronic camera further includes a moving object detection unit 124 that can detect a movement of an object to be photographed and/or the background in the image plane and can transmit moving object information to the system control unit 115. More specifically, the moving object detection unit 124 compares two sheets of images that have been time-sequentially processed by the image processing unit 110 to detect moving object information (operation amount, position, range, etc.) of the object to be photographed or the background based on obtained difference information.

The electronic camera further includes an angular speed sensor unit 125 that can detect a movement of the camera itself and transmit camera movement information to the CPU 115. The angular speed sensor unit 125 can be used to determine whether the camera is held in a portrait state or in a landscape state.

The DRAM 113 can be used as a high-speed buffer that stores image data, or can be used as a working memory in image compression/decompression processing.

The operation unit 118 includes, for example, a menu switch that enables users to perform various settings (e.g., image-capturing function settings and image playback settings for the imaging apparatus, etc.), a zooming lever that enables users to cause the photographic lens 101 to perform a zooming operation, and an operation mode selection switch that enables users to switch the operation between the shooting mode and the playback mode.

An example of an operation that can be performed by the electronic camera according to an example embodiment of the present invention is described below with reference to a flowchart illustrated in FIG. 2.

First, in step S201, the CPU 115 detects the operational state (ON/OFF) of the first switch SW1, which instructs a shooting preparation operation. If it is determined that the first switch SW1 is in an ON state (YES in step S201), the processing proceeds to step S212. If it is determined that the first switch SW1 is in an OFF state (NO in step S201), then in step S202, the CPU 115 performs scene stabilization determination processing according to a below-described procedure.

In step S203, the CPU 115 determines whether stabilization of the shooting scene has been confirmed through the determination processing in step S202. If it is determined that the shooting scene is not yet stabilized (NO in step S203), the processing returns to step S201.

In the context of the present specification, the state where the shooting scene is stabilized can be regarded as a state where an object to be photographed is stable and the camera body is held stably.

If it is determined that the shooting scene is already stabilized (YES in step S203), then in step S204, the CPU 115 determines whether the luminance of the object is equal to or less than a predetermined value.

If it is determined that the luminance of the object is equal to or less than the predetermined value (YES in step S204), then in step S205, the CPU 115 performs low-illuminance AF frame setting. In the context of the present specification, the AF frame (i.e., focus detection region) indicates a region in which a focus evaluation value can be acquired.

Further, the focus evaluation value is a value indicting a high-frequency component (a specific frequency band signal component) of a luminance signal extracted by the image processing unit 110 from an image signal, which is a digital signal converted from an analog signal read by the image sensor 108.

The CPU 115 stores the focus evaluation value in association with the position of the focusing lens 104 and the AF frame position. The acquisition of the focus evaluation value indicates that the AF processing unit 105 reads the focus evaluation value stored in the CPU 115 for a determination in the AF control.

In a case where the illuminance is low, a long exposure time is consumed and, therefore, securing sufficient AF accuracy by the scan is difficult. Therefore, in the present exemplary embodiment, when the illuminance is low, object region identification is not performed and no scan processing is performed for the face detection processing. A single AF frame having a predetermined size is set at a central region of the image plane.

If it is determined that the luminance of the object is greater than the predetermined value (NO in step S204), then in step S206, the CPU 115 determines whether there is any face detected by the face detection module 123.

If it is determined that any face is detected (YES in step S206), then in step S207, the CPU 115 performs face detection AF scan processing according to a below-described procedure. Then, the processing proceeds to step S209.

If it is determined that there is not any face detected by the face detection module 123 (NO in step S206), then in step S208, the CPU 115 performs object region identifying AF scan processing according to a below-described procedure.

In step S209, the CPU 115 performs continuous AF processing according to a below-described procedure. In step S210, the CPU 115 performs scene instability determination processing according to a below-described procedure. In step S211, the CPU 115 determines whether instability of the shooting scene has been confirmed through the determination processing in step S210.

If it is determined that the shooting scene is unstable (YES in step S211), the processing returns to step S201. If it is determined that the shooting scene is stable (NO in step S211), the processing returns to step S209. In the context of the present specification, the state where the shooting scene is unstable can be regarded as a state where an object to be photographed is unstable and the camera body is held unstably.

In step S212, the CPU 115 sets an in-focus degree determination flag to "FALSE." In step S213, the CPU 115 performs image capturing processing according to a below-described procedure.

Further, in addition to the above-described operation, the AE processing unit 103 constantly performs an AE operation based on a control signal supplied from the CPU 115 by controlling the diaphragm/shutter 102 so that the brightness of an image can be appropriately displayed on the operation display unit 117.

Figure 2:
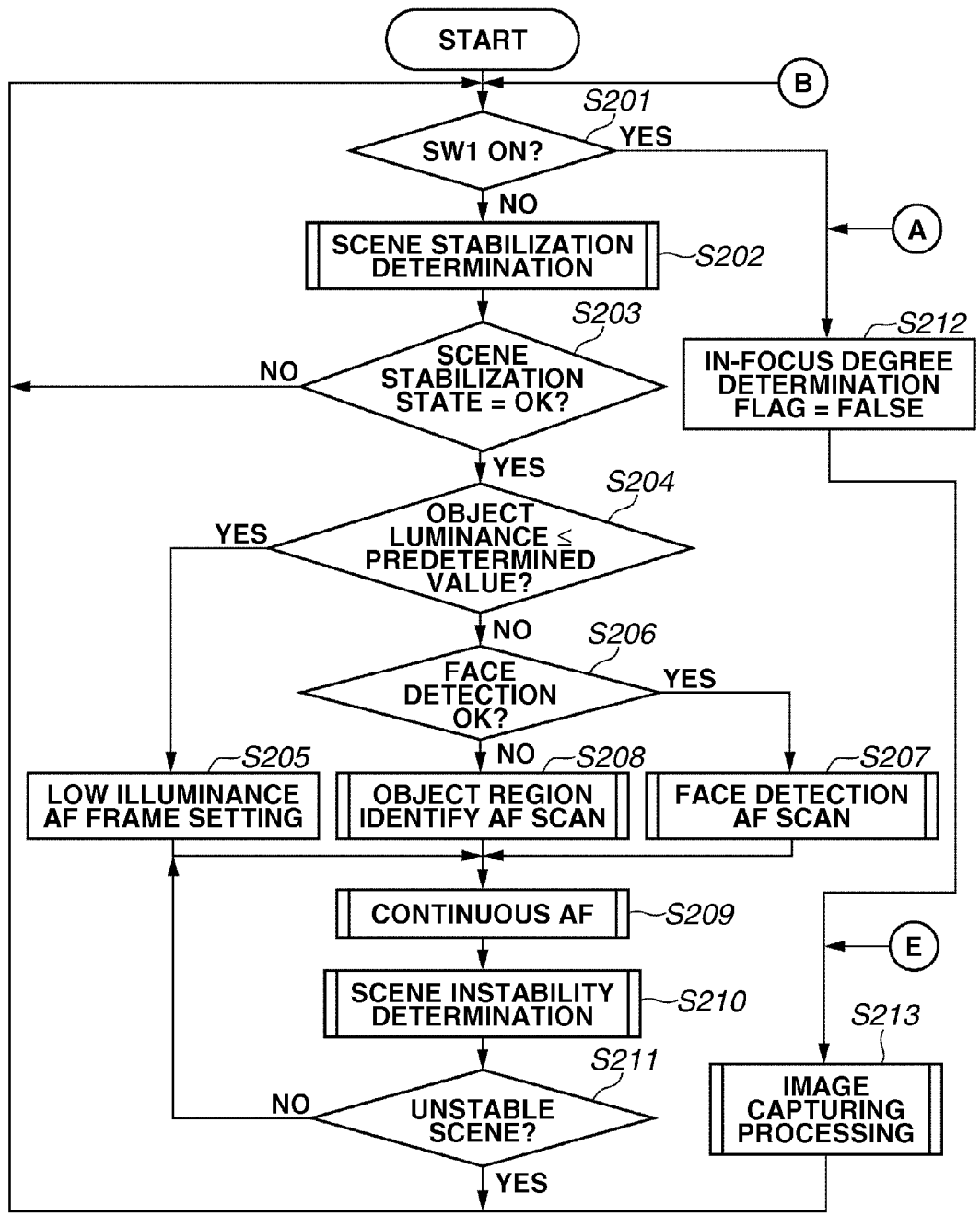
FIG. 2 is a flowchart illustrating an operation that can be performed by the electronic camera according to an exemplary embodiment of the present invention.
Figure 3:
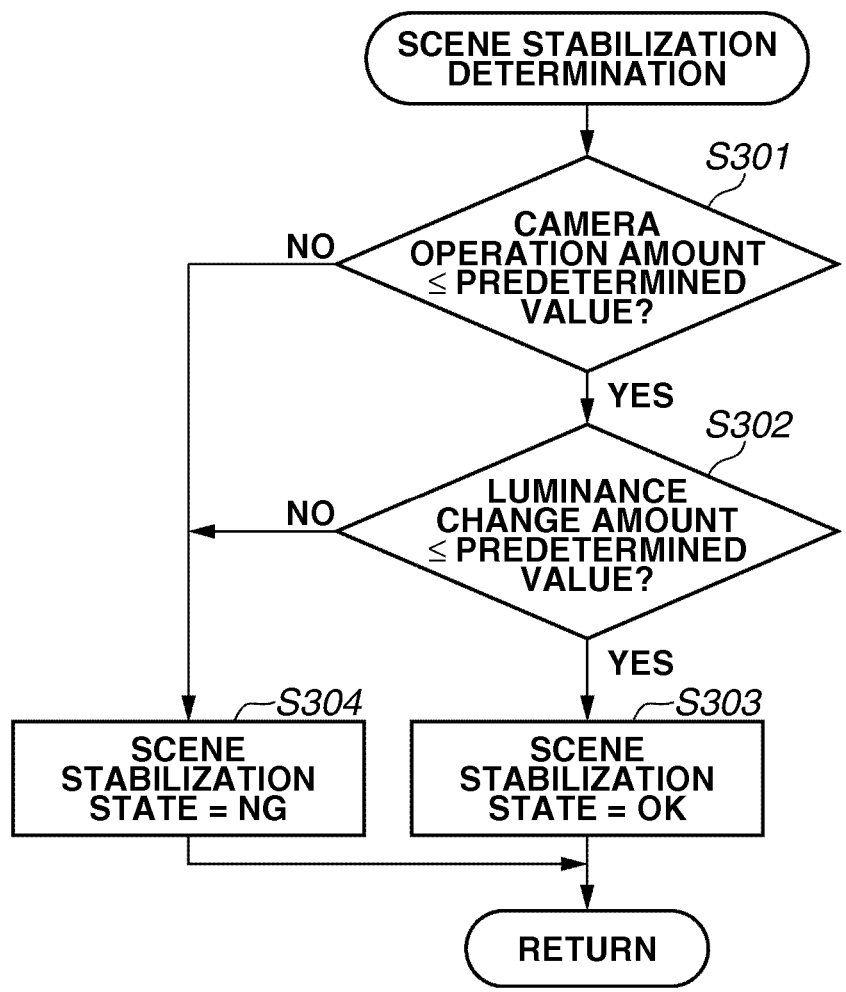
FIG. 3 is a flowchart illustrating a subroutine relating to scene stabilization determination processing illustrated in FIG. 2 according to an exemplary embodiment of the present invention.

FIG. 3 is a flowchart illustrating details of the scene stabilization determination processing to be performed in step S202 illustrated in FIG. 2. In step S301, the CPU 115 determines whether a camera operation amount detected by the angular speed sensor unit 125 is equal to or less than a predetermined amount. If it is determined that the detected camera operation amount is greater than the predetermined amount (NO in step S301), the processing proceeds to step S304.

In the present exemplary embodiment, if the camera operation amount is equal to or less than the predetermined amount, the CPU 115 determines that the camera is in a stable state.

If it is determined that the detected camera operation amount is equal to or less than the predetermined amount (YES in step S301), then in step S302, the CPU 115 determines whether a change amount in luminance is equal to or less than a predetermined amount. In the present exemplary embodiment, when the luminance change amount is equal to or less than the predetermined value, the CPU 115 determines that the object to be photographed has not changed.

If it is determined that the luminance change amount is equal to or less than the predetermined amount (YES in step S302), then in step S303, the CPU 115 determines that the shooting scene is in a stabilized state and terminates the processing of this routine.

If it is determined that the luminance change amount is greater than the predetermined amount (NO in step S302), then in step S304, the CPU 115 determines that the shooting scene is not in the stabilized state and terminates the processing of this routine.

Figure 4:
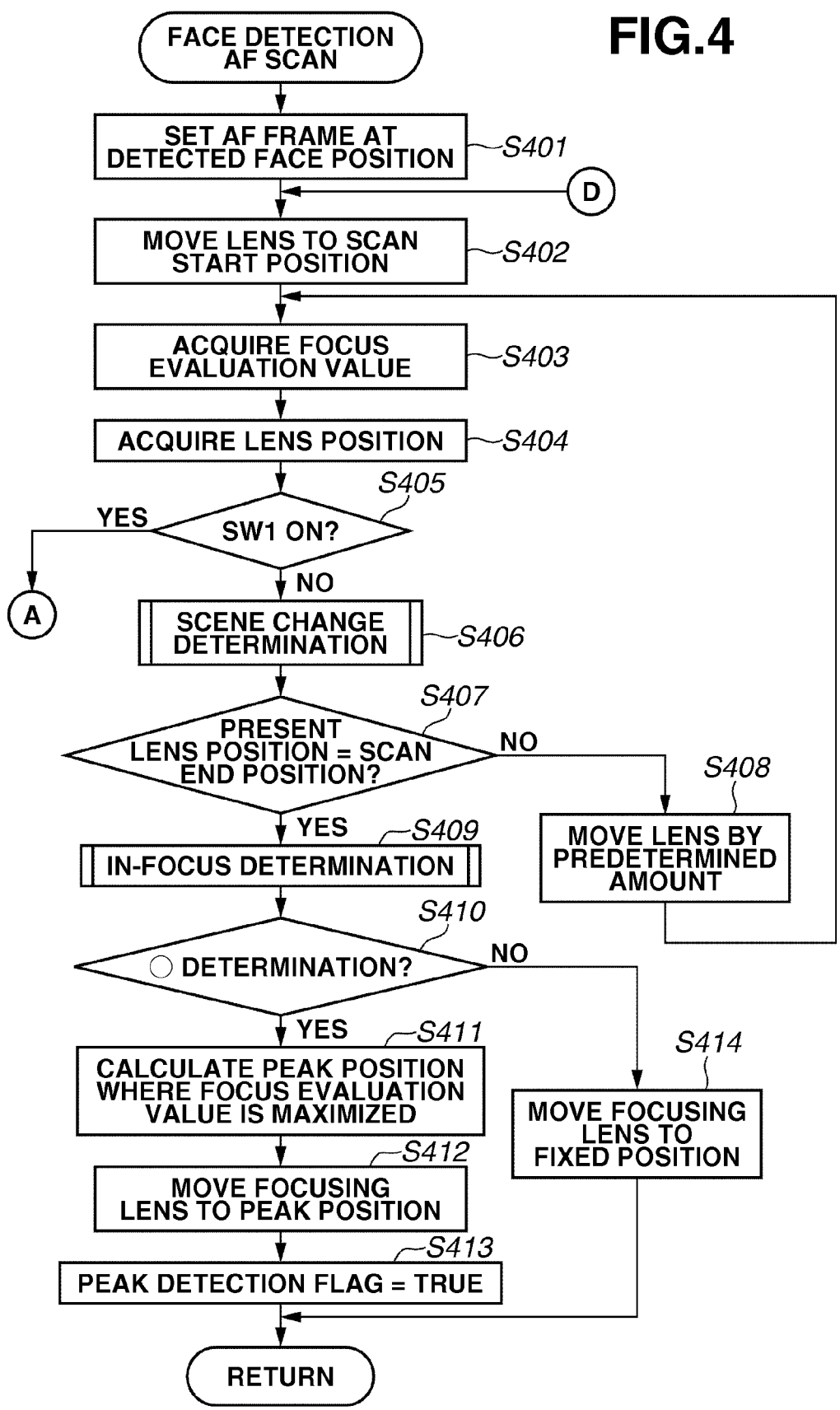
FIG. 4 is a flowchart illustrating a subroutine relating to face detection AF scan processing illustrated in FIG. 2 according to an exemplary embodiment of the present invention.

FIG. 4 is a flowchart illustrating details of the face detection AF scan processing to be performed in step S207 illustrated in FIG. 2.

In step S401, the CPU 115 performs AF frame setting based on face information (e.g., position, size, and reliability) detected by the face detection module 123. In step S402, the CPU 115 causes the AF processing unit 105 to move the focusing lens 104 to a scan start position. In the present exemplary embodiment, the scan start position can be determined, for example, based on the distance of an object person that can be estimated according to the size of a detected face.

In step S403, the CPU 115 stores a focus evaluation value at the present focusing lens position in the DRAM 113. In step S404, the CPU 115 acquires the present position of the focusing lens 104 and stores the acquired position data in the DRAM 113.

In step S405, the CPU 115 detects the operational state (ON/OFF) of the first switch SW1 that instructs a shooting preparation operation. If it is determined that the first switch SW1 is in the ON state (YES in step S405), the CPU 115 terminates the processing of this routine and proceeds to step S212.

If it is determined that the first switch SW1 is in the OFF state (NO in step S405), then in step S406, the CPU 115 performs scene change determination processing according to a below-described procedure. The scene change determination is processing for identifying any change in a scene to be photographed based on a state of the camera and a state of the object to be photographed.

In step S407, the CPU 115 determines whether the present position of the focusing lens 104 coincides with a scan end position. In the present exemplary embodiment, the scan end position can be determined, for example, based on the distance of the object person that can be estimated according to the size of the detected face.

If it is determined that the present position of the focusing lens 104 does not coincide with the scan end position (NO in step S407), then in step S408, the CPU 115 causes the AF processing unit 105 to move the focusing lens 104 toward a scan end direction by a predetermined amount. Then, the processing returns to step S403.

If it is determined that the present position of the focusing lens 104 coincides with the scan end position (YES in step S407), then in step S409, the CPU 115 performs in-focus determination processing according to a below-described procedure.

In step S410, the CPU 115 determines whether the in-focus determination result in step S409 is a "○ determination." If the in-focus determination result is not the "○ determination" (NO in step S410), the processing proceeds to step S414. In the context of the present specification, the "○ determination" indicates that the contrast of the object to be photographed is sufficient and the object to be photographed is present in a scanned distance range.

If the in-focus determination result is the "○ determination" (YES in step S410), then in step S411, the CPU 115 calculates an in-focus position where the focus evaluation value acquired in step S403 can be maximized (i.e., becomes a peak value). In step S412, the CPU 115 causes the AF processing unit 105 to move the focusing lens 104 to the in-focus position calculated in step S411. In step S413, the CPU 115 sets a peak detection flag to "TRUE."

In step S414, i.e., when the determination in step S410 is not the "○ determination", more specifically, in a case where the contrast of the object to be photographed is insufficient, or in a case where the object to be photographed is present outside the scanned distance range, the AF processing unit 105 moves the focusing lens 104 to a predetermined position (fixed point) stored beforehand in the DRAM 113.

In the present exemplary embodiment, the fixed point can be set at a specific distance where a probability of presence of the object to be photographed is very high. For example, if a face is already detected, the fixed point can be set to a point corresponding to the distance of the object person estimated based on the size of the detected face.

Figure 5:
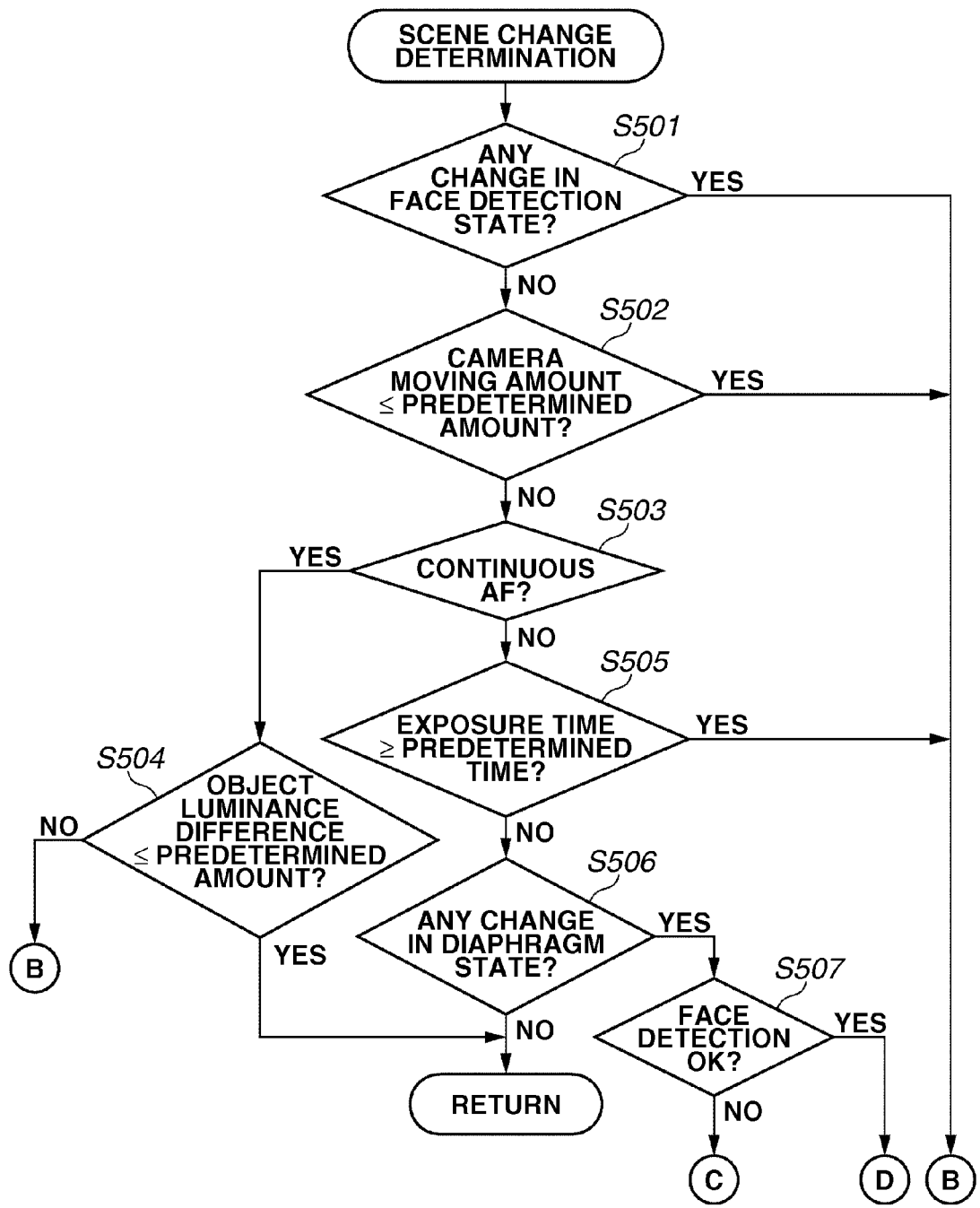
FIG. 5 is a flowchart illustrating a subroutine relating to scene change determination processing illustrated in FIG. 4, FIG. 11, FIG. 14, and FIG. 21 according to an exemplary embodiment of the present invention.
Figure 11:
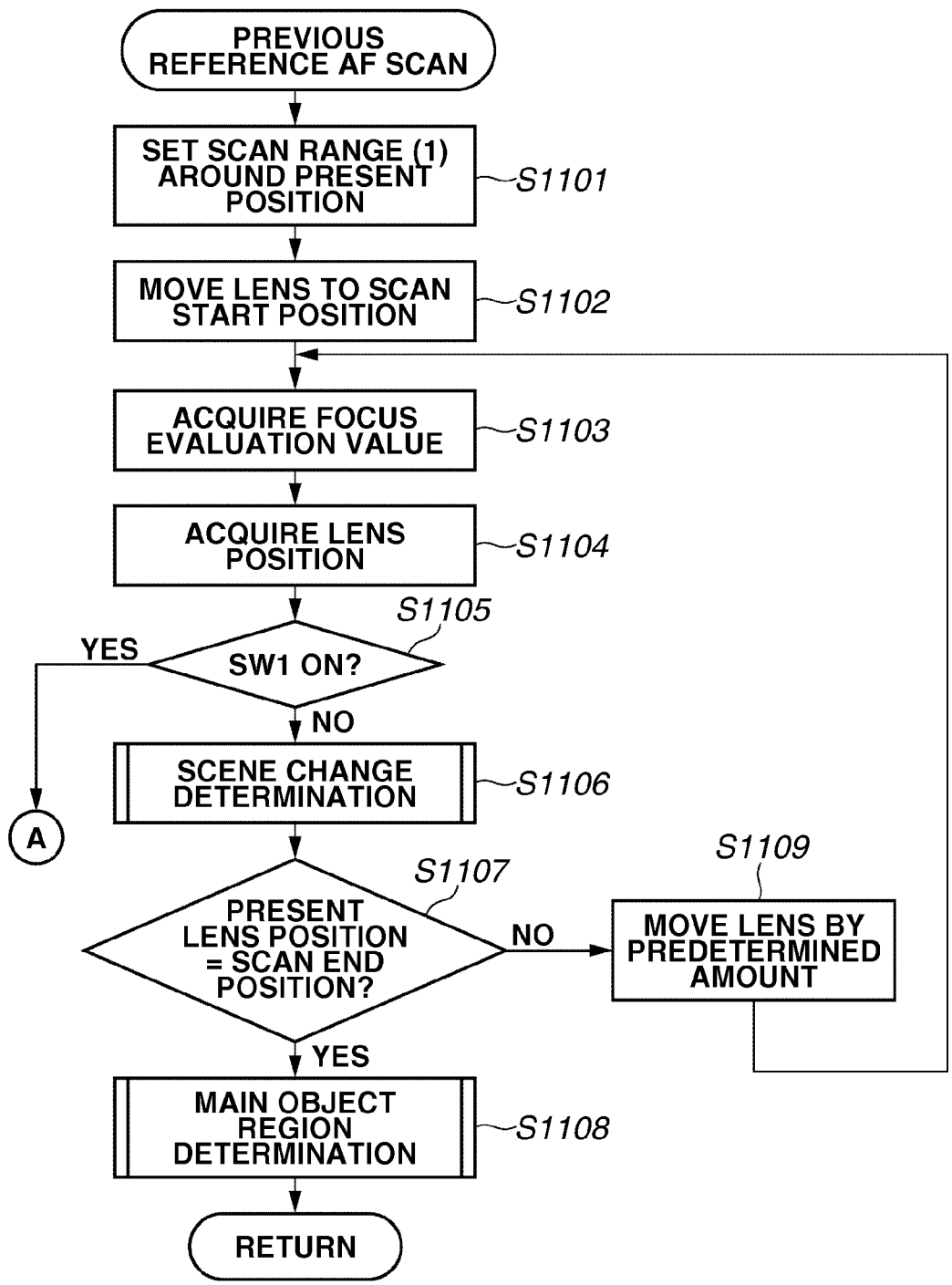
FIG. 11 is a flowchart illustrating a subroutine relating to previous reference AF scan processing illustrated in FIG. 8 according to an exemplary embodiment of the present invention.
Figure 21:
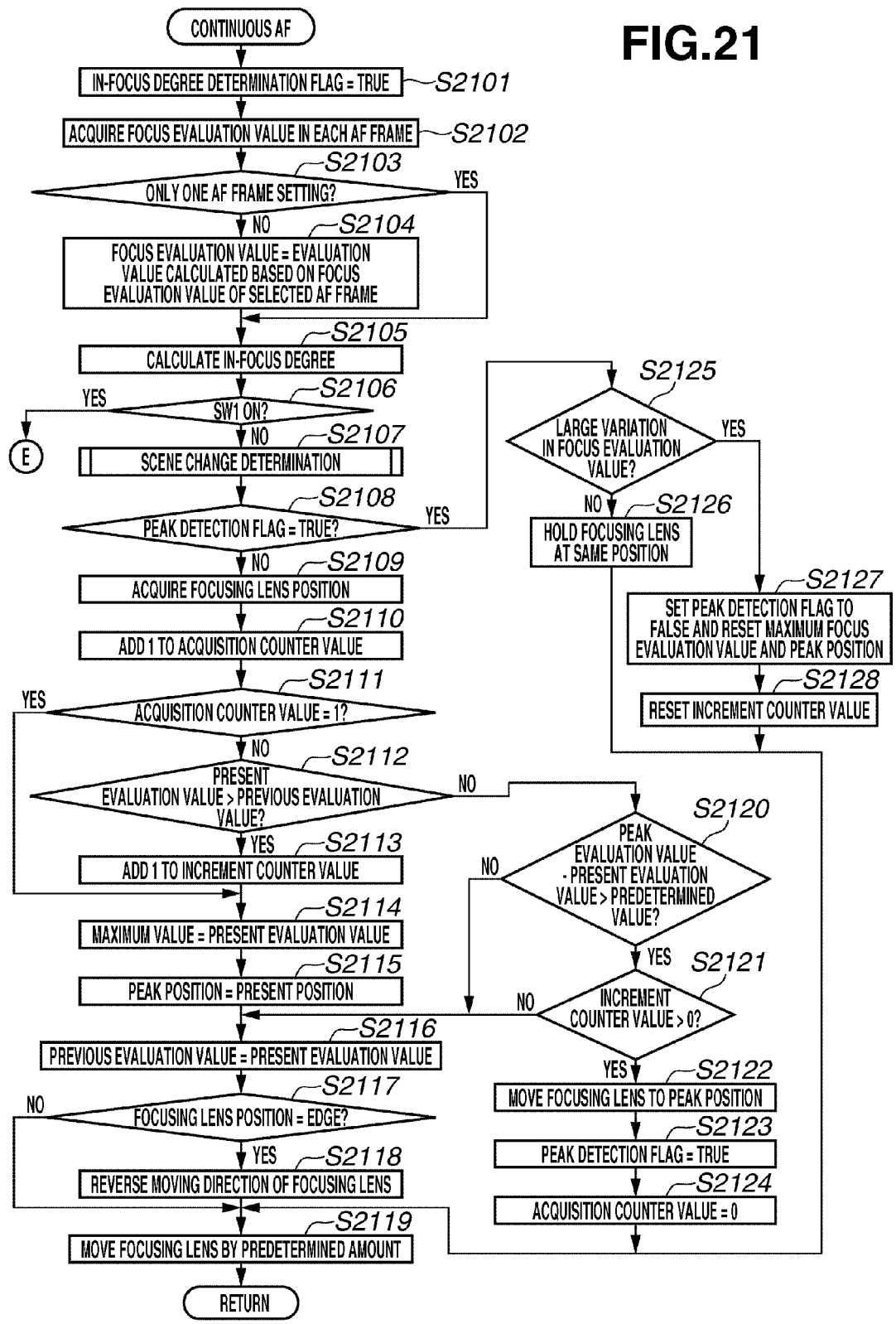
FIG. 21 is a flowchart illustrating a subroutine relating to continuous AF processing illustrated in FIG. 2 according to an exemplary embodiment of the present invention.

FIG. 5 is a flowchart illustrating the scene change determination to be performed in step S406 illustrated in FIG. 4, in step S1106 illustrated in FIG. 11, in step S1405 illustrated in FIG. 14, and step S2107 illustrated in FIG. 21.

In step S501, the CPU 115 determines whether there is any change in the face detection state detected in the face detection module 123. If it is determined that the face detection state has changed (YES in step S501), the CPU 115 terminates the determination processing of this routine and returns to step S201.

In the context of the present specification, the face detection state indicates a state where a face has been detected. More specifically, if no face is detected in the present scene change determination although a face was detected in the previous scene change determination, the CPU 115 determines that the face detection state has changed.

If it is determined that the face detection state has not changed (NO in step S501), then in step S502, the CPU 115 determines whether the camera operation amount detected by the angular speed sensor unit 125 is equal to or greater than a predetermined amount. If it is determined that the detected camera operation amount is equal to or greater than the predetermined amount (YES in step S502), the CPU 115 terminates the determination processing of this routine and returns to step S201.

If it is determined that the detected camera operation amount is less than the predetermined amount (NO in step S502), then in step S503, the CPU 115 determines whether the camera is currently performing a below-described continuous AF operation. If it is determined that the camera is currently performing the continuous AF operation (YES in step S503), then in step S504, the CPU 115 determines whether an object luminance difference is equal to or less than a predetermined value.

The object luminance difference is a difference between an object luminance value acquired in the previous scene change determination and an object luminance value detected in the present scene change determination.

In a case where the object luminance difference is large, the CPU 115 determines that the scene has changed. If the object luminance difference is equal to or less than a predetermined value (NO in step S504), the CPU 115 terminates the determination processing of this routine. If the object luminance difference is greater than the predetermined value (YES in step S504), the CPU 115 terminates the determination processing of this routine and returns to step S201.

If it is determined that the camera is not currently performing the continuous AF operation (NO in step S503), then in step S505, the CPU 115 determines whether the exposure time is equal to or greater than a predetermined time. If it is determined that the exposure time is equal to or greater than the predetermined time (YES in step S505), the CPU 115 terminates the determination processing of this routine and returns to step S201.

The reason why the CPU 115 terminates the determination processing is because, in a case where the exposure time is equal to or longer than the predetermined time, the time interval for acquiring the focus evaluation value becomes too long to secure sufficient AF accuracy.

If it is determined that the exposure time is less than the predetermined time (NO in step S505), then in step S506, the CPU 115 determines whether there is any change in the operational state of the diaphragm 102. If it is determined that the operational state of the diaphragm 102 has not changed (NO in step S506), the CPU 115 terminates the determination processing of this routine.

In the present exemplary embodiment, the CPU 115 performs diaphragm control. However, in a case where the CPU 115 performs exposure control using an ND filter, the CPU 115 can check a change in the operational state of the ND filter. Similar to the diaphragm, in a case where the operational state of the ND filter is changed, the peak position of the focus evaluation value changes.

If it is determined that the operational state of the diaphragm 102 has changed (YES in step S506), then in step S507, the CPU 115 determines whether there is any face detected by the face detection module 123. If it is determined that any face is detected (YES in step S507), the CPU 115 terminates the determination processing of this routine and proceeds to step S402. If it is determined that there is not any face detected by the face detection module 123 (NO in step S507), the CPU 115 terminates the determination processing of this routine and proceeds to step S809 illustrated in FIG. 8.

Figure 15:
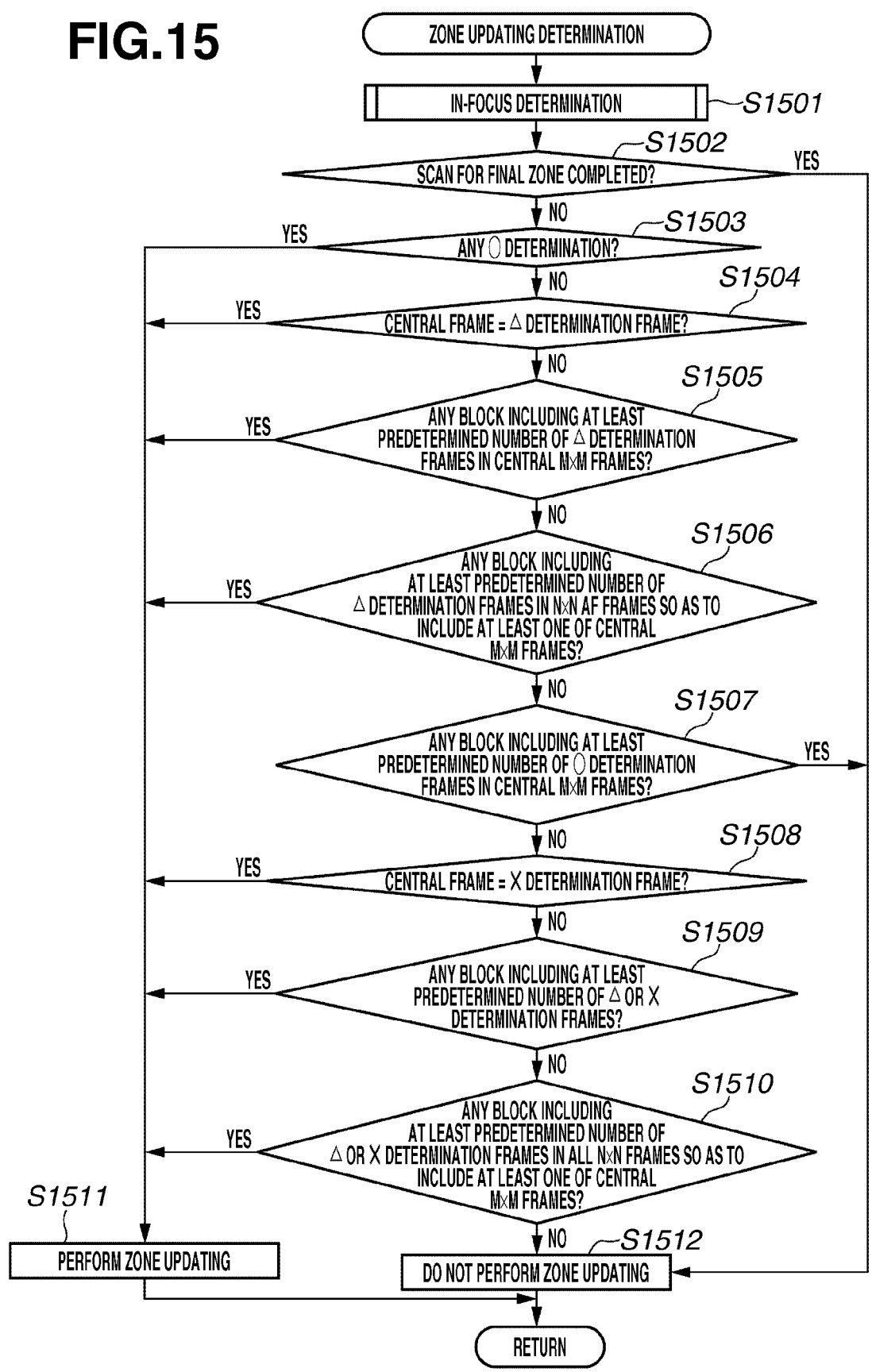
FIG. 15 is a flowchart illustrating a subroutine relating to zone updating determination processing illustrated in FIG. 14 according to an exemplary embodiment of the present invention.

A subroutine relating to the in-focus determination processing to be performed in step S409 illustrated in FIG. 4, in step S1201 illustrated in FIG. 12, and in step S1501 illustrated in FIG. 15, is described below with reference to FIGS. 6 and 7.

Figure 7:
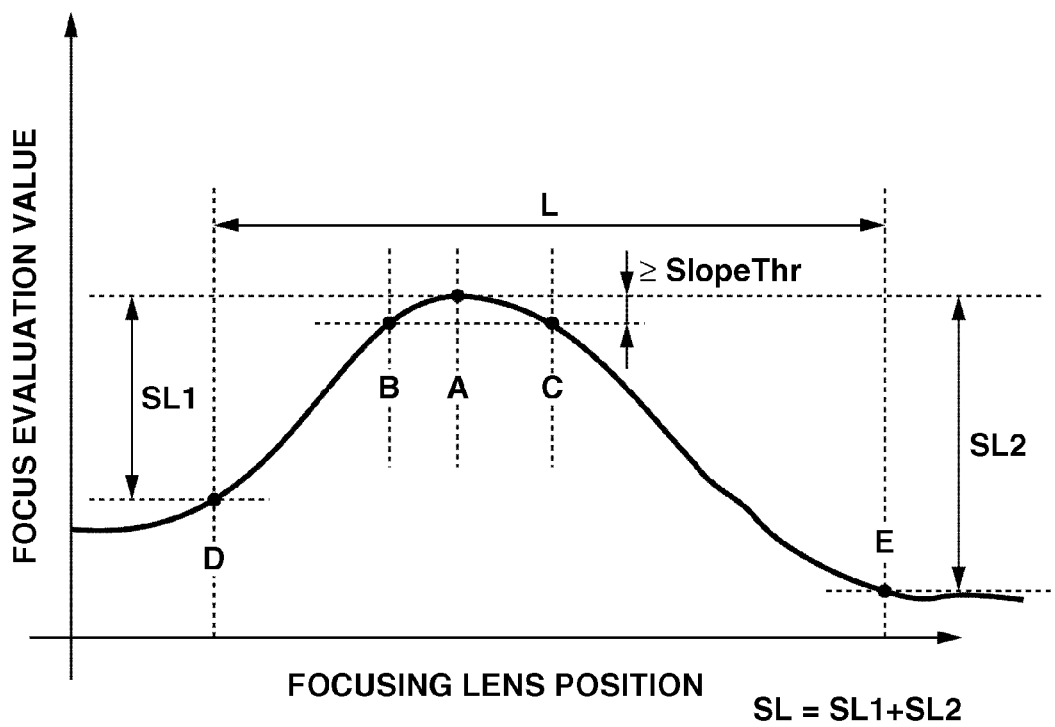
FIG. 7 illustrates an example of a method for the in-focus determination processing to be performed according to the flowchart illustrated in FIG. 6.

Except for far/near focusing conflict, the focus evaluation value can be expressed as a mountain shape as illustrated in FIG. 7, in which the abscissa axis represents the focusing lens position and the ordinate axis represents the focus evaluation value.

The CPU 115 can perform the in-focus determination by checking the mountain shape, which can be defined, for example, using a difference between a maximum value and a minimum value of the focus evaluation value, a length of a portion that is inclined at a gradient equal to or greater than a predetermined value (SlopeThr), and a gradient of the inclined portion.

A determination result of the in-focus determination processing can be output as "○ determination", "x determination", or "Δ determination" in the following manner. "○ determination": The contrast of an object to be photographed is sufficient and the object to be photographed is present in the scanned distance range.

"x determination": The contrast of an object to be photographed is insufficient or the object to be photographed is not present in the scanned distance range.

"Δ determination": an object to be photographed is not present in the scanned distance range and positioned on the near side relative to the scanned distance range.

In FIG. 7, as dimensions defining the mountain shape, L represents a length of an inclined portion (including an uphill portion and a downhill portion) and SL/L represents a gradient of each portion.

It is assumed that a slope of the mountain extends from a point D to a point E via an apex (i.e., point A). A length between the point D and the point E defines the width L of the mountain. The slope range is a region where scan points, each having a smaller focus evaluation value (more than a predetermined amount "SlopeThr"), are continuous present from the point A. In the context of the present specification, the scan point is a point where the focus evaluation value can be acquired while the focusing lens is continuously moved from a scan start point to a scan end point.

SL is equal to a sum of SL1+SL2, where SL1 is a difference in the focus evaluation value between the point A and the point D, and SL2 is a difference in the focus evaluation value between the point A and the point E.

Figure 6:
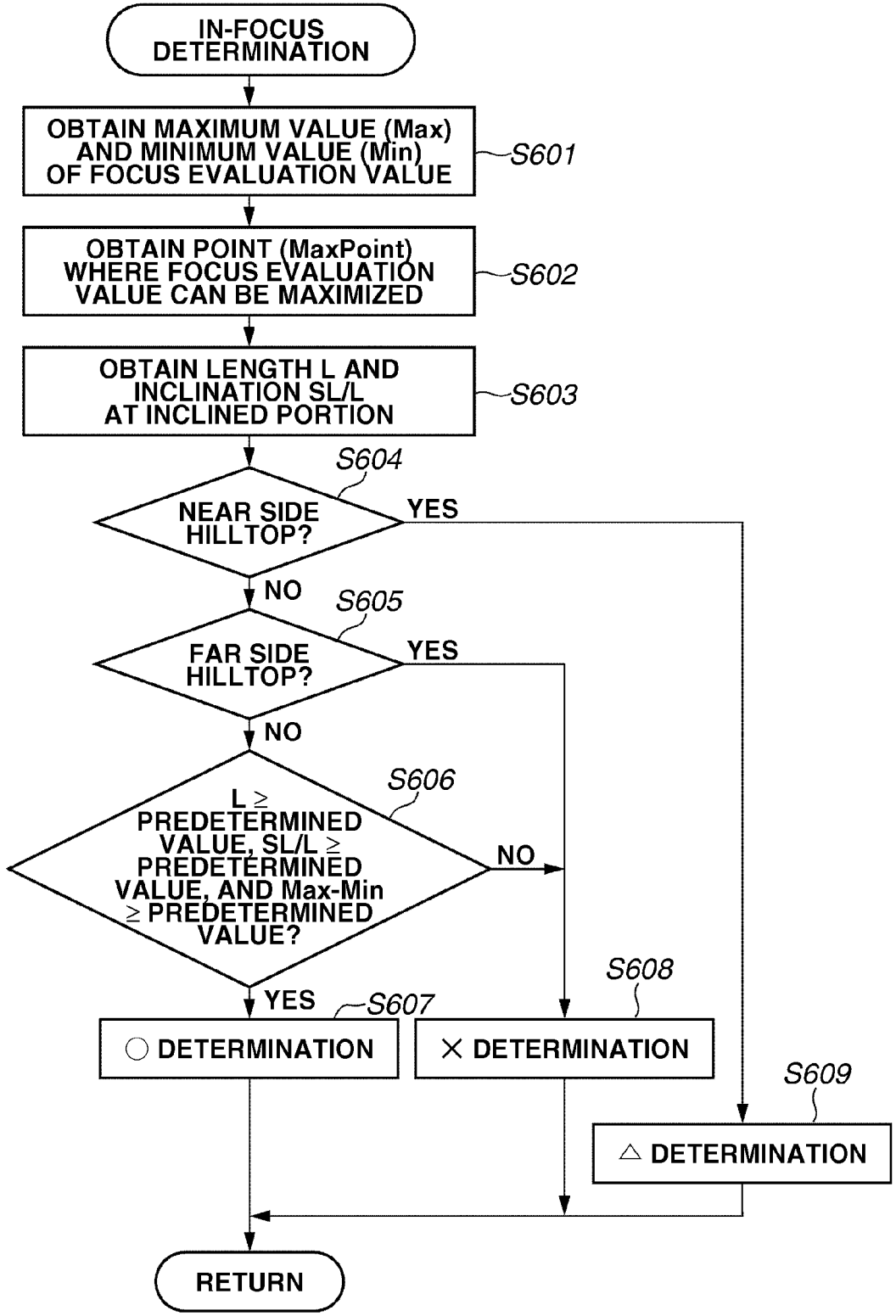
FIG. 6 is a flowchart illustrating a subroutine relating to in-focus determination processing illustrated in FIG. 4, FIG. 12, and FIG. 15 according to an exemplary embodiment of the present invention.
Figure 12:
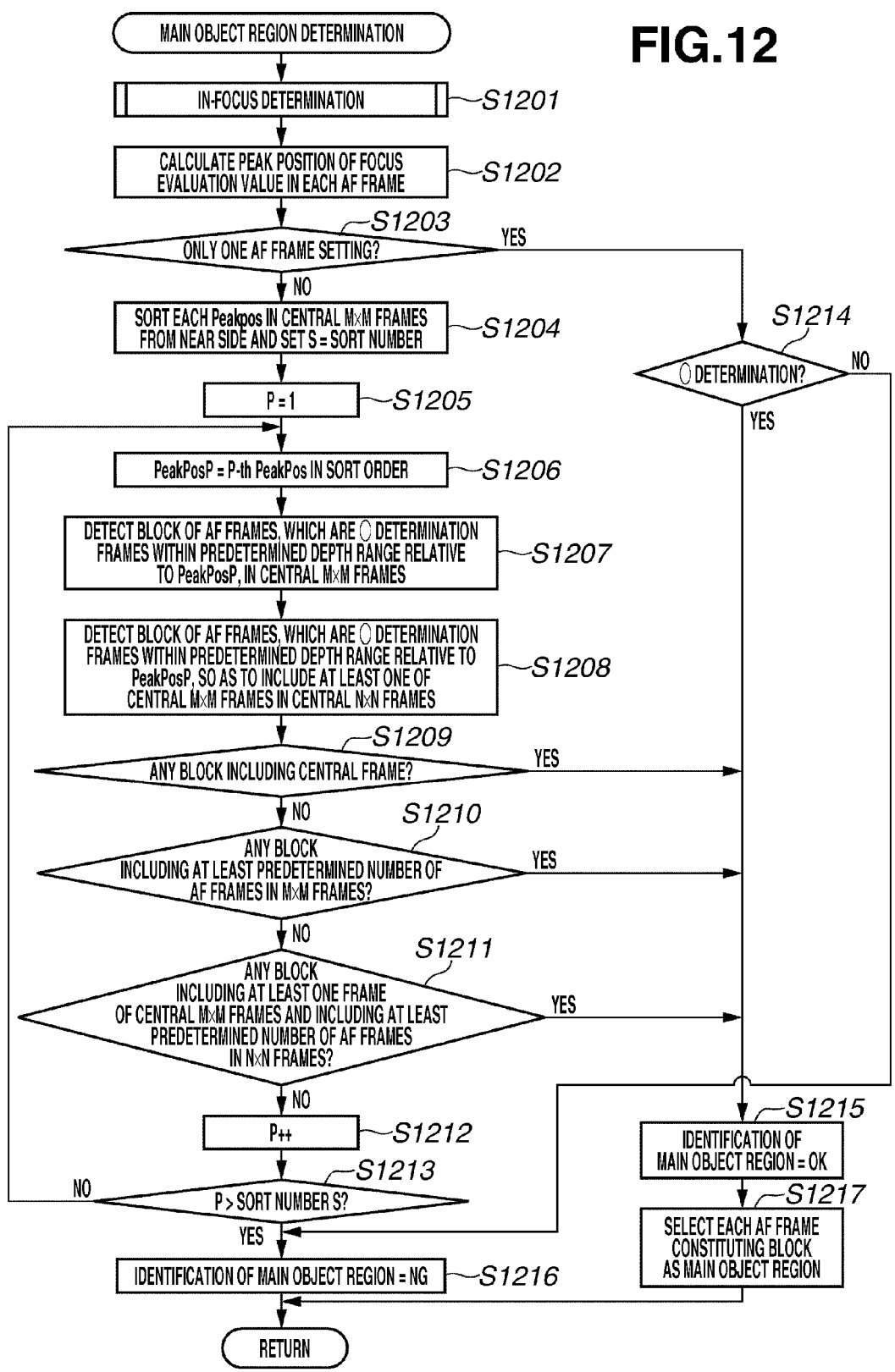
FIG. 12 is a flowchart illustrating a subroutine relating to main object region determination processing illustrated in FIG. 11 and FIG. 14 according to an exemplary embodiment of the present invention.

FIG. 6 is a flowchart illustrating the in-focus determination processing to be performed in step S409 illustrated in FIG. 4, in step S1201 illustrated in FIG. 12, and in step S1501 illustrated in FIG. 15. In step S601, the CPU 115 obtains a maximum value and a minimum value of the focus evaluation value. Next, in step S602, the CPU 115 obtains a scan point where the focus evaluation value can be maximized. Then, the processing proceeds to step S603.

In step S603, the CPU 115 obtains two dimensions L and SL that can define a mountain shape, with reference to the scan point and the focus evaluation value. Then, the processing proceeds to step S604.

In step S604, the CPU 115 determines whether the mountain shape is a near side hilltop. More specifically, the CPU 115 determines that the mountain shape is the near side hilltop when the scan point where the focus evaluation value can be maximized is a near side edge of a predetermined scanned range.

The CPU 115 further determines whether a difference between a focus evaluation value at the nearest scan point and a focus evaluation value at the next nearest scan point is equal to or greater than a predetermined value. If it is determined that the mountain shape is the near side hilltop (YES in step S604), the processing proceeds to step S609.

If it is determined that the mountain shape is not the near side hilltop (NO in step S604), then in step S605, the CPU 115 determines whether the mountain shape is a far side hilltop. More specifically, the CPU 115 determines that the mountain shape is the far side hilltop when the scan point where the focus evaluation value can be maximized is a far side edge of a predetermined scanned range. The CPU 115 further determines whether a difference between a focus evaluation value at the farthest scan point and a focus evaluation value at the next farthest scan point is equal to or greater than a predetermined value.

If it is determined that the mountain shape is not the far side hilltop (NO in step S605), then in step S606, the CPU 115 determines whether the length L of the slope portion is equal to or greater than a predetermined value, determines whether an average gradient value SL/L of the slope is equal to or greater than a predetermined value, and further determines whether a difference between the maximum focus evaluation value (Max) and the minimum focus evaluation value (Min) is equal to or greater than a predetermined value.

If it is determined that all of the above-described three conditions are satisfied (YES in step S606), then in step S607, the CPU 115 generates the "○ determination" as a determination result based on the grounds that the shape of the obtained focus evaluation values has a mountain shape, the contrast of the object to be photographed is sufficient, and the focus adjustment can be performed properly.

If it is determined that the mountain shape is the far side hilltop (YES in step S605), or if it is determined that at least one of the above-described three conditions is not satisfied (NO in step S606), then in step S608, the CPU 115 generates the "x determination" as a determination result based on the grounds that the shape of the obtained focus evaluation values is not a mountain shape, the contract of the object to be photographed is insufficient, and the focus adjustment cannot be performed properly.

In step S609, the CPU 115 generates the "Δ determination" as a determination result because the focus evaluation value is in a climbing state toward the near edge direction, and the possibility that the object peak is present on the near side is relatively high, nevertheless the shape of the obtained focus evaluation value is not a mountain shape. The in-focus determination processing is performed in the manner described above.

Figure 8:
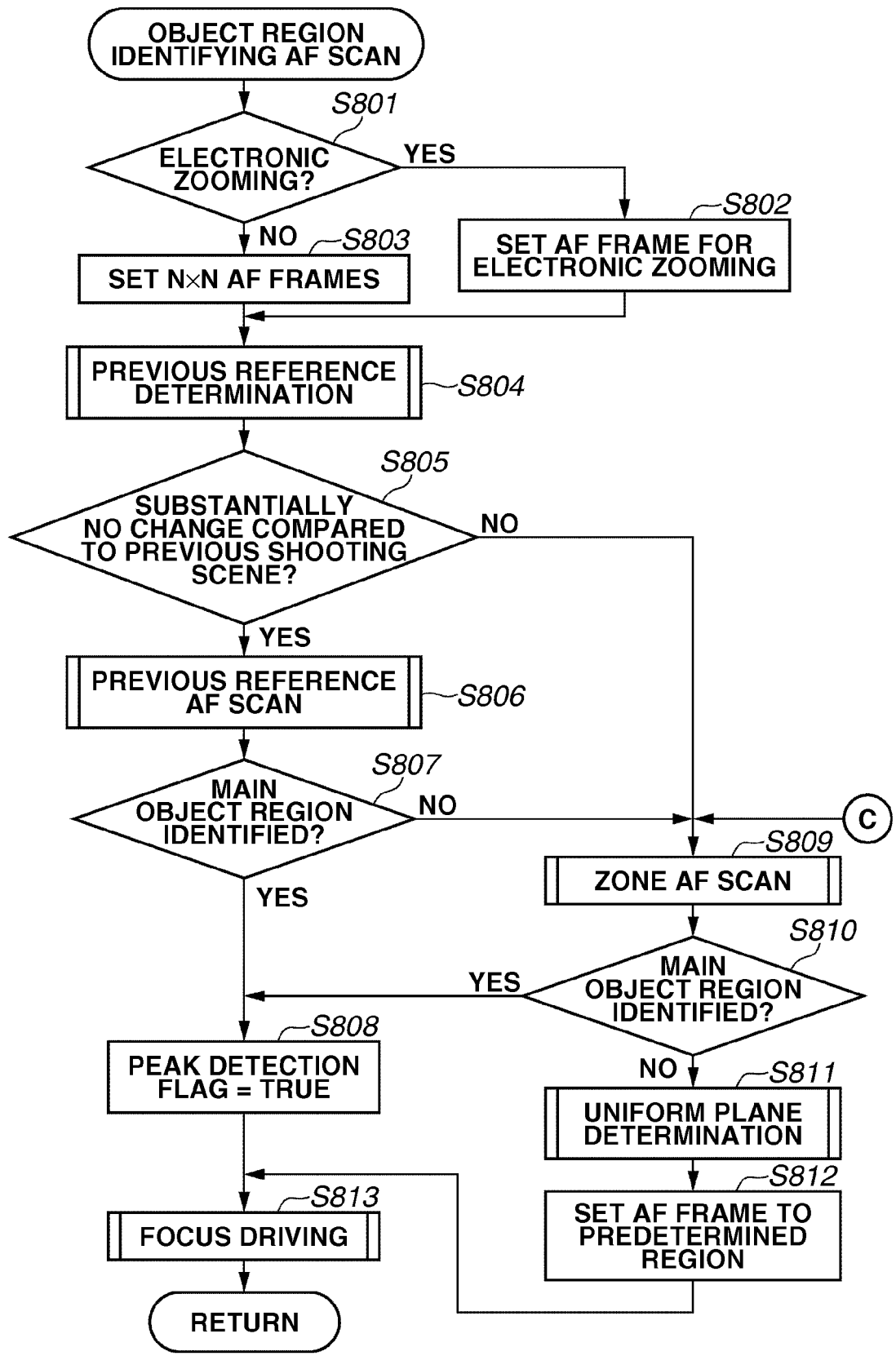
FIG. 8 is a flowchart illustrating a subroutine relating to object region identifying AF scan processing illustrated in FIG. 2 according to an exemplary embodiment of the present invention.

FIG. 8 is a flowchart illustrating details of the object region identifying AF scan processing to be performed in step S208 illustrated in FIG. 2. In the present exemplary embodiment, the CPU 115 performs AF scan processing for identifying an image plane region where a main object is present.

First, in step S801, the CPU 115 determines whether the camera is currently performing an electronic zooming operation. If it is determined that the camera is currently performing the electronic zooming operation (YES in step S801), then in step S802, the CPU 115 performs AF frame setting for the electronic zooming operation. In the context of the present specification, the electronic zooming is an operation for displaying an enlarged image of a central region of the image plane on the operation display unit 117.

The pixel number of the enlarged image, when displayed on the operation display unit 117, is smaller compared to pixel number of a normal image that is not electronically zoomed. Accordingly, if the AF frame setting to be performed on the image displayed on the operation display unit 117 in the electronic zooming operation is similar to the normal AF frame setting, the S/N ratio of the focus evaluation value deteriorates proportionally as the pixel number in each AF frame becomes smaller.

Therefore, in the case where the camera is performing the electronic zooming operation compared to the case where the camera is not performing the electronic zooming operation, the AF frame setting is to be changed. In the present exemplary embodiment, when the camera is performing the electronic zooming operation, the CPU 115 sets only one AF frame having a predetermined size at substantially the center of the image plane.

Figure 9:
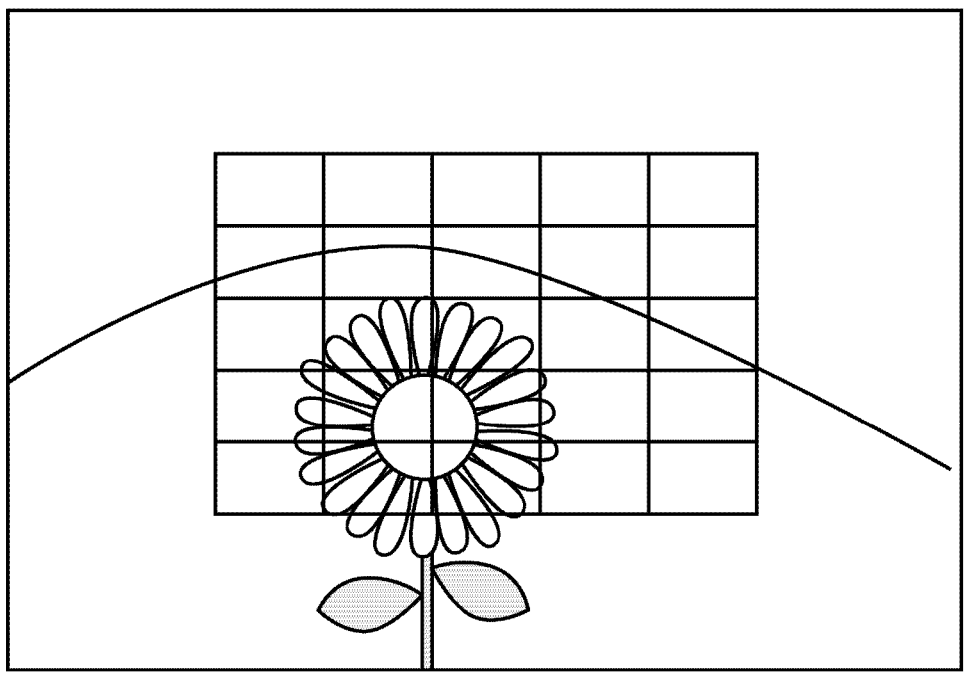
FIG. 9 illustrates an example of AF frame setting to be performed according to the flowchart illustrated in FIG. 8.

If it is determined that the camera is not currently performing the electronic zooming operation (NO in step S801), then in step S803, the CPU 115 sets N×N AF frames in the image plane. FIG. 9 illustrates an example of the AF frame setting to be performed in a case where N=5 and the size of each AF frame is equivalent to 10% of the entire image plane in both the vertical and horizontal directions.

It is useful to adequately determine the value of N or the AF frame size considering the possibility of the presence of a main object in the image plane. Further, it is useful to change the number of AF frames disposed in the horizontal direction compared to the number of AF frames disposed in the vertical direction.

In step S804, the CPU 115 performs previous reference determination processing according to a below-described procedure. In step S805, the CPU 115 determines whether there is no substantial change in the shooting scene compared to the previous scene based on a result of the previous reference determination processing performed in step S804.

If it is determined that there is no substantial change in the shooting scene (YES in step S805), then in step S806, the CPU 115 performs previous reference AF scan processing according to a below-described procedure. In step S807, the CPU 115 determines whether a main object region has been identified in the previous reference AF scan processing performed in step S806. If it is determined that the main object region has been identified (YES in step S807), then in step S808, the CPU 115 sets the peak detection flag to "TRUE."

If it is determined that the shooting scene has substantially changed (NO in step S805), or if it is determined that the main object region has not been identified (NO in step S807), then in step S809, the CPU 115 performs zone AF scan processing according to a below-described procedure.

In step S810, the CPU 115 determines whether the main object region has been identified in the zone AF scan performed in step S809. If it is determined that the main object region has been identified (YES in step S810), the processing proceeds to step S808.

If it is determined that the main object region has not been identified (NO in step S810), then in step S811, the CPU 115 performs uniform plane determination processing according to a below-described procedure.

In step S812, the CPU 115 sets an AF frame to a predetermined region having been set beforehand in the image plane because the main object region was not identified in the zone AF scan processing performed in step S809. In the present exemplary embodiment, the above-described predetermined region can be set to a region where the probability of presence of the main object is very high, such as a central region of the image plane.

In step S813, the CPU 115 performs focusing driving processing according to a below-described procedure.

Figure 10:
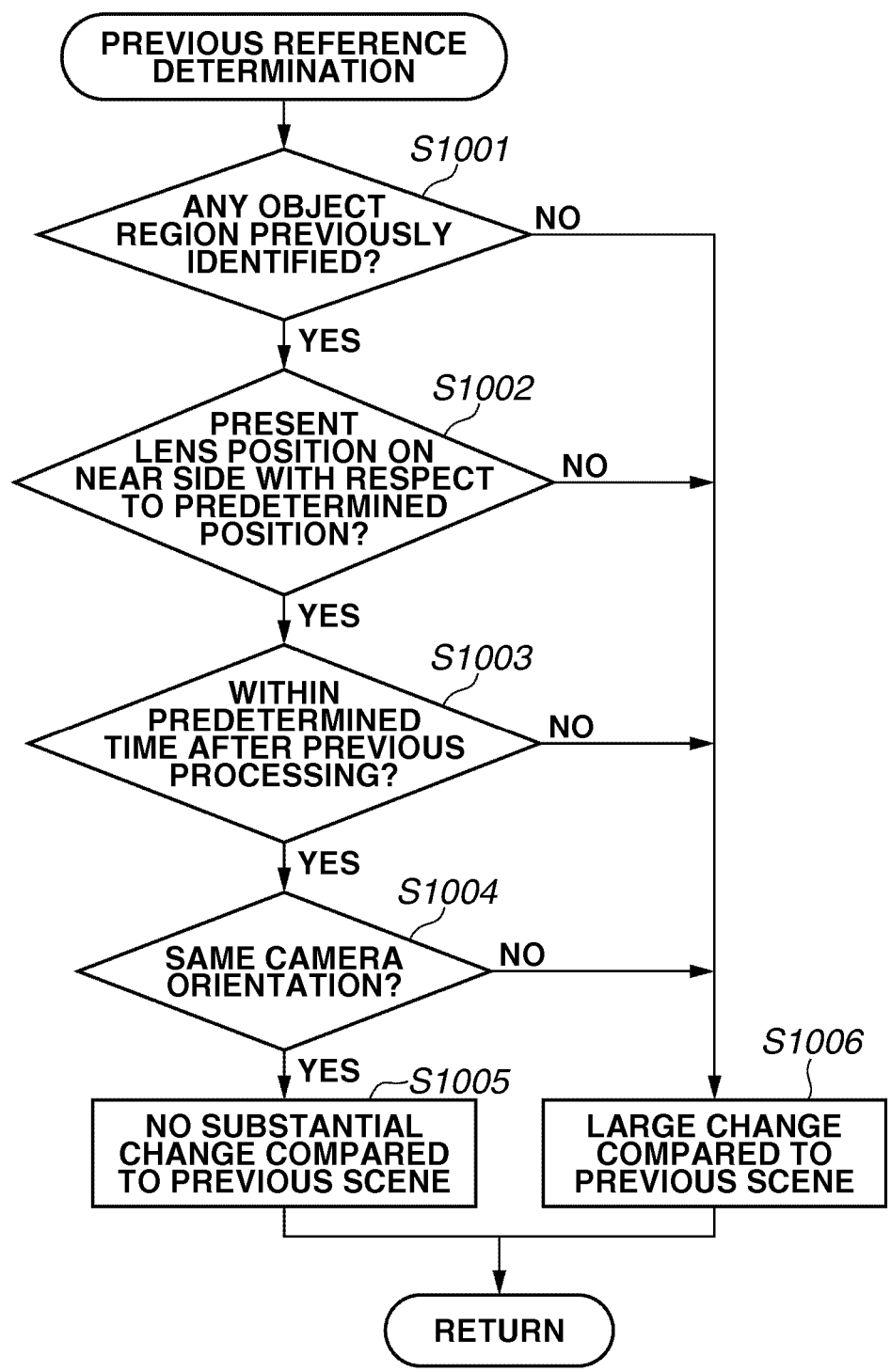
FIG. 10 is a flowchart illustrating a subroutine relating to previous reference determination processing illustrated in FIG. 8 according to an exemplary embodiment of the present invention.

FIG. 10 is a flowchart illustrating details of the previous reference determination processing to be performed in step S804 illustrated in FIG. 8. In the present exemplary embodiment, the CPU 115 determines whether there is any substantial change in the present shooting scene compared to the previous shooting scene subjected to the AF scan processing.

First, in step S1001, the CPU 115 determines whether the main object region has been identified in the previous AF scan processing. If it is determined that the main object region has not been identified (NO in step S1001), the processing proceeds to step S1006.

If it is determined that the main object region has been identified (YES in step S1001), then in step S1002, the CPU 115 determines whether the present position of the focusing lens 104 is on the near side with respect to the predetermined position. If it is determined that the present position of the focusing lens 104 is not on the near side (NO in step S1002), the processing proceeds to step S1006.

In the present exemplary embodiment, the determination in step S1002 is not limited to the near side with respect to the predetermined position. For example, in step S1002, the CPU 115 can determine whether the present position of the focusing lens 104 is on the far side with respect to the predetermined position.

If it is determined that the present position of the focusing lens 104 is on the near side (YES in step S1002), then in step S1003, the CPU 115 determines whether a time difference between the previous AF scan processing and the present AF scan processing is within a predetermined time. If it is determined that the time difference is not within the predetermined time (NO in step S1003), the processing proceeds to step S1006.

If it is determined that the time difference is within the predetermined time (YES in step S1003), then in step S1004, the CPU 115 determines whether the orientation of the camera in the present AF scan processing is the same as the orientation of the camera in the previous AF scan processing. If it is determined that the present orientation of the camera is different from the orientation in the previous AF scan processing (NO in step S1004), the processing proceeds to step S1006.

In the context of the present specification, the orientation of the camera indicates the camera position in the vertical and horizontal directions, which can be detected by the angular speed sensor unit 125.

If it is determined that the orientation of the camera remains the same between the present AF scan processing and the previous AF scan processing (YES in step S1004), then in step S1005, the CPU 115 determines that the shooting scene has not substantially changed after the previous AF scan processing and terminates the determination processing of this routine.

In step S1006, the CPU 115 determines that the shooting scene has greatly changed compared to the previous AF scan processing and terminates the determination processing of this routine.

FIG. 11 is a flowchart illustrating details of the previous reference AF scan processing to be performed in step S806 illustrated in FIG. 8.

First, in step S1101, the CPU 115 sets a first scan range around the present position of the focusing lens 104. In this case, the first scan range set by the CPU 115 is a narrow range because the determination result indicates that there is no substantial change in the shooting scene compared to the previous AF scan processing.

In step S1102, the CPU 115 moves the focusing lens 104 to the scan start position. In step S1103, the A/D conversion unit 109 converts an analog video signal read by the image sensor 108 into a digital signal and the image processing unit 110 extracts a high-frequency component of a luminance signal from the output signal. The CPU 115 stores the extracted high-frequency component as a focus evaluation value. In step S1104, the CPU 115 acquires the present position of the focusing lens 104 and stores the acquired position data.

In step S1105, the CPU 115 detects the operational state (ON/OFF) of the first switch SW1 that instructs a shooting preparation operation. If it is determined that the first switch SW1 is in the ON state (YES in step S1105), the CPU 115 terminates the processing of this routine and proceeds to step S212.

If it is determined that the first switch SW1 is in the OFF state (NO in step S1105), then in step S1106, the CPU 115 performs the above-described scene change determination processing. In step S1107, the CPU 115 determines whether the present position of the focusing lens 104 coincides with the scan end position.

If it is determined that the present position of the focusing lens 104 coincides with the scan end position (YES in step S1107), then in step S1108, the CPU 115 performs main object region determination processing according to a below-described procedure.

If it is determined that the present position of the focusing lens 104 does not coincide with the scan end position (NO in step S1107), then in step S1109, the CPU 115 causes the AF processing unit 105 to move the focusing lens 104 toward the scan end direction by a predetermined amount. Then, the processing returns to step S1103.

FIG. 12 is a flowchart illustrating details of the main object region determination processing to be performed in step S1108 illustrated in FIG. 11 and in step S1411 illustrated in FIG. 14. In the present exemplary embodiment, the CPU 115 determines whether the main object region has been identified in the image plane.

Figure 13A:
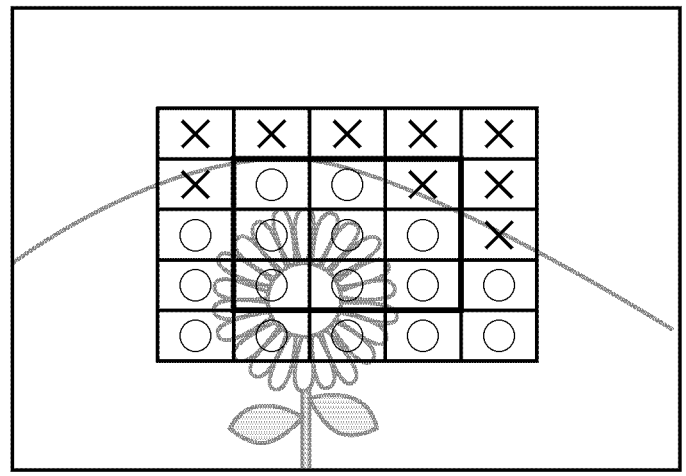
FIGS. 13A to 13C illustrate an example of the main object region determination processing to be performed in the flowchart illustrated in FIG. 11 and FIG. 14, according to an exemplary embodiment of the present invention.
Figure 13B:
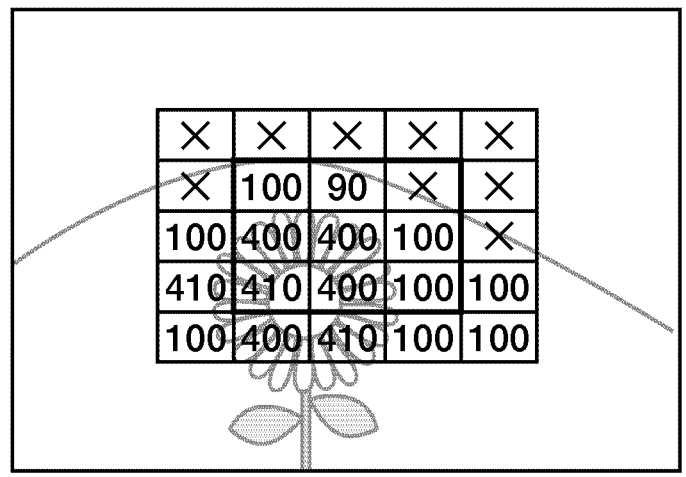
Figure 13C:
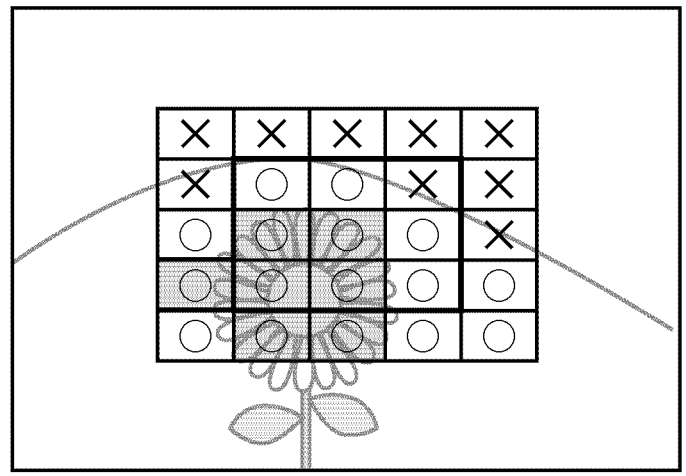

FIGS. 13A to 13C illustrate an example of the main object region determination processing according to the flowchart illustrated in FIG. 12. In the illustrated example, it is assumed that the AF frame size is equivalent to 10% of the image plane, N=5, the scan range is 0 to 500, and a predetermined depth range is ±10. The numerical values representing the scan range and the predetermined depth range can be used to express the position of the focusing lens 104. Each value corresponds to the pulse number of a stepping motor that can be used as a driving motor (not illustrated) for the focusing lens 104. When the value is large, the focusing lens is positioned on the near side.

First, in step S1201, the CPU 115 performs the above-described in-focus determination processing for all of respective AF frames having been set. For example, it is assumed that an in-focus determination result illustrated in FIG. 13A can be obtained in each AF frame.

In step S1202, the CPU 115 calculates and stores a peak position (hereinafter, referred to as "PeakPos") of the focus evaluation value in each AF frame. For example, it is assumed that a peak position calculation result illustrated in FIG. 13B can be obtained in each AF frame. In step S1203, the CPU 115 determines whether the AF frame having been set is only one frame. If it is determined that only one AF frame is set (YES in step S1203), the processing proceeds to step S1214.

If it is determined that two or more AF frames have been set (NO in step S1203), then in step S1204, the CPU 115 sorts the PeakPos of each AF frame in the central M×M frames from the near side and sets the number of the sorted frames as "S." In the following description, it is assumed that M=3. FIG. 13A illustrates a bold line that surrounds a total of nine frames, three frames in the vertical direction and three frames in the horizontal direction.

In this case, if an AF frame is determined as "x determination" in the in-focus determination in step S1201, the peak position cannot be calculated and therefore this AF frame is not regarded as an object to be sorted. For example, in the example illustrated in FIG. 13B, the CPU 115 sorts 410, 400, 400, 400, 100, 100, 100, and 90 in this order and then sets the sort number "S"=8.

In step S1205, the CPU 115 sets a counter value "P" to 1. The counter value "P" indicates an order of the peak position, from the near side, in the M×M frames calculated in step S1202.

In step S1206, the CPU 115 sets the P-th PeakPos in the sort order as PeakPosP. For example, in the example illustrated in FIG. 13B, the PeakPosP value is 410 in a case where P=1.

In step S1207, the CPU 115 detects a "block" of AF frames, which are the "○ determination" frames within a predetermined depth range relative to the PeakPosP, in the central M×M AF frames. The CPU 115 stores the number of the AF frames constituting the "block" and the position of each AF frame.

In the context of the present specification, the "block" indicates an assembly of a plurality of AF frames that satisfy the determination conditions and are disposed continuously in the up-and-down direction and the right-and-left direction. In a case where two or more "blocks" are present, the CPU 115 can select one of these "blocks" considering the number of AF frames constituting a "block" and the position of the "block."

In step S1208, the CPU 115 detects a "block" of AF frames, which are the "○ determination" frames within a predetermined depth range relative to the PeakPosP, so as to include at least one of the central M×M AF frames in the central N×N AF frames. The CPU 115 stores the number of the AF frames constituting the "block" and the position of each AF frame. FIG. 13C illustrates a gray "block" that can be obtained according to the determination results illustrated in FIGS. 13A and 13B.

In step S1209, the CPU 115 determines whether the "block" detected in step S1207 or in step S1208 is a "block" including the central frame. If it is determined that the "block" includes the central frame (YES in step S1209), the processing proceeds to step S1215.

If it is determined that the "block" does not include the central frame (NO in step S1209), then in step S1210, the CPU 115 determines whether the "block" detected in step S1207 or in step S1208 is a "block" including at least a predetermined number of AF frames in the region of the M×M frames. If it is determined that at least the predetermined number of AF frames are included in the region of the M×M frames (YES in step S1210), the processing proceeds to step S1215.

If it is determined that the "block" does not include the predetermined number of AF frames (NO in step S1210), then in step S1211, the CPU 115 determines whether the "block" detected in step S1207 or in step S1208 is a "block" including at least one of the central M×M frames and including at least a predetermined number of AF frames in the N×N frames. If it is determined that the "block" includes at least one of the central M×M frames and includes at least the predetermined number of AF frames in the N×N frames (YES in step S1211), the processing proceeds to step S1215.

If it is determined that the "block" does not include at least one of the central M×M frames or does not include at least the predetermined number of AF frames in the N×N frames (NO in step S1211), then in step S1212, the CPU 115 adds 1 to the counter value "P".

In step S1213, the CPU 115 determines whether the counter value "P" is greater than the sort number "S." If it is determined that the counter value "P" is not greater than the sort number "S" (NO in step S1213), the CPU 115 repeats the above-described processing in steps S1206 to S1212. If it is determined that the counter value "P" is greater than the sort number "S" (YES in step S1213), the processing proceeds to step S1216.

In step S1214, the CPU 115 determines whether the in-focus determination result in step S1201 is the "∘ determination." If it is determined that the in-focus determination result in step S1201 is the "∘ determination" (YES in step S1214), the processing proceeds to step S1215. If it is determined that the in-focus determination result in step S1201 is not the "∘ determination" (NO in step S1214), the processing proceeds to step S1216.

In step S1215, the CPU 115 determines that the main object region was successfully identified. Then, in step S1217, the CPU 115 selects each AF frame constituting the block as (at least part of) the main object region and terminates the determination processing of this routine. If the AF frame having been set is only one frame, the CPU 115 selects the one frame. In step S1216, the CPU 115 determines that the main object region was not successfully identified and terminates the determination processing of this routine.

FIG. 14 is a flowchart illustrating details of the zone AF scan processing to be performed in step S809 illustrated in FIG. 8. In the context of the present specification, the "zone" indicates each area when a focusable distance range is segmented into a plurality of areas.

First, in step S1401, the CPU 115 moves the focusing lens 104 to the scan start position. The "scan start position" can be, for example, set to a point at infinity. In step S1402, the A/D conversion unit 109 converts an analog video signal read by the image sensor 108 into a digital signal and the image processing unit 110 extracts a high-frequency component of a luminance signal from the output signal. The CPU 115 stores the extracted high-frequency component as a focus evaluation value.

In step S1403, the CPU 115 acquires the present position of the focusing lens 104 and stores the acquired position data. In step S1404, the CPU 115 detects the operational state (ON/OFF) of the first switch SW1 that instructs a shooting preparation operation. If it is determined that the first switch SW1 is in the ON state (YES in step S1404), the CPU 115 terminates the processing of this routine and proceeds to step S212.

If it is determined that the first switch SW1 is in the OFF state (NO in step S1404), then in step S1405, the CPU 115 performs the above-described scene change determination. In step S1406, the CPU 115 determines whether the focusing lens 104 is located on a boundary position of a zone having been set beforehand. If it is determined that the focusing lens 104 is not located on the boundary position (NO in step S1406), the processing proceeds to step S1409.

If it is determined that the focusing lens 104 is located on the boundary position (YES in step S1406), then in step S1407, the CPU 115 performs zone updating determination processing according to a below-described procedure. In the context of the present specification, the "zone updating" indicates continuously performing scanning of a zone upon completing scanning of a neighboring zone.

In step S1408, the CPU 115 determines whether to perform the zone updating as a result of the determination processing performed in step S1407. If it is determined that the zone updating is performed (YES in step S1408), the processing proceeds to step S1409. If it is determined that the zone updating is not performed (NO in step S1408), the processing proceeds to step S1411.

In step S1409, the CPU 115 determines whether the present position of the focusing lens 104 coincides with the scan end position. If it is determined that the present position of the focusing lens 104 coincides with the scan end position (YES in step S1409), the processing proceeds to step S1411.

If it is determined that the present position of the focusing lens 104 does not coincide with the scan end position (NO in step S1409), then in step S1410, the CPU 115 moves the focusing lens 104 toward the scan end direction by a predetermined amount. The processing returns to step S1402. In step S1411, the CPU 115 performs the above-described main object region determination processing.

Figure 16A:
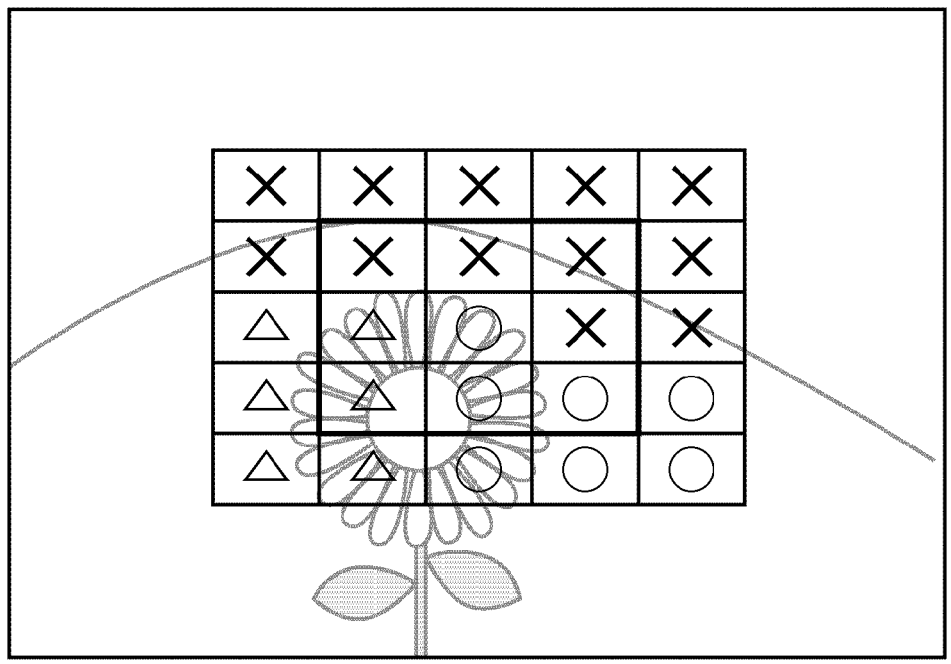
FIGS. 16A and 16B illustrate an example of the zone updating determination processing to be performed according to the flowchart illustrated in FIG. 15.
Figure 16B:
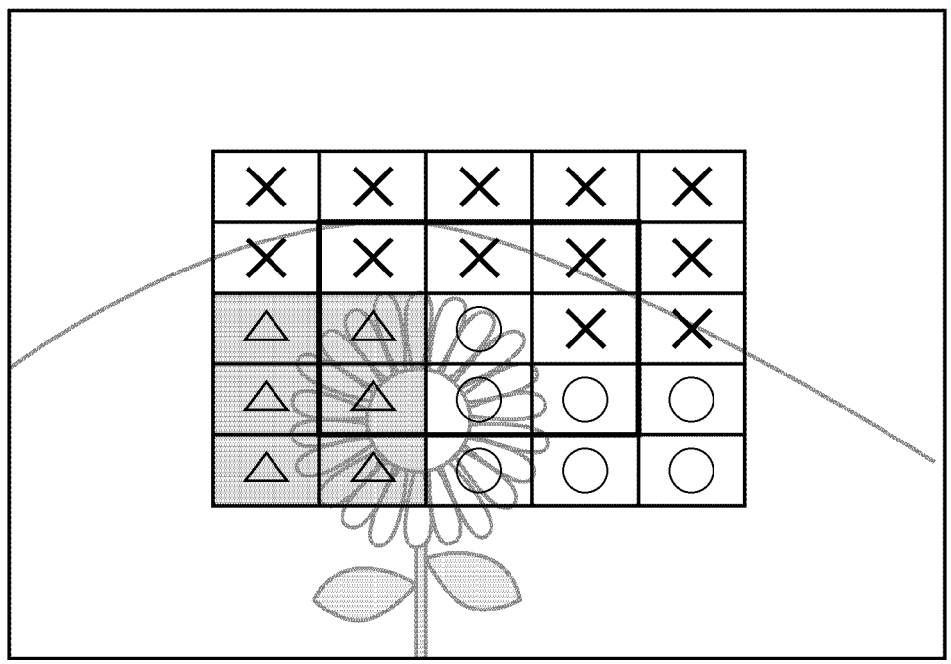

FIG. 15 is a flowchart illustrating details of the zone updating determination processing to be performed in step S1407 illustrated in FIG. 14. In the present exemplary embodiment, the CPU 115 determines whether the main object is present in a region extending along the scan direction. Namely, the CPU 115 determines whether to continue the AF scan processing. FIGS. 16A and 16B illustrate an example of the zone updating determination according to the flowchart illustrated in FIG. 15. In the illustrated example, the size of each AF frame is equivalent to 10% of the image plane, N=5, and M=3.

First, in step S1501, the CPU 115 performs the above-described in-focus determination for all of respective AF frames having been set. FIG. 16A illustrates an example of the in-focus determination result in respective AF frames.

In step S1502, the CPU 115 determines whether the scan processing for the final zone has been completed. If it is determined that the scan processing for the final zone has been completed (YES in step S1502), the processing proceeds to step S1512.

If it is determined that the scan processing for the final zone is not yet completed (NO in step S1502), then in step S1503, the CPU 115 determines whether there in any "∘ determination" frame. If it is determined that the "∘ determination" frame is not present (NO in step S1503), the processing proceeds to step S1511. If it is determined that the "∘ determination" frame is present (YES in step S1503), then in step S1504, the CPU 115 determines whether the central frame is a "Δ determination" frame. If it is determined that the central frame is the "Δ determination" frame (YES in step S1504), the processing proceeds to step S1511.

If it is determined that the central frame is not the "Δ determination" frame (NO in step S1504), then in step S1505, the CPU 115 determines whether there is any "block" including at least a predetermined number of "Δ determination" frames in the central M×M frames. If it is determined that the "block" including at least the predetermined number of "Δ determination" frames in the central M×M frames is present (YES in step S1505), the processing proceeds to step S1511. For example, in the example illustrated in FIG. 16A, the predetermined number in step S1505 is 2.

If it is determined that the "block" including at least the predetermined number of "Δ determination" frames in the central M×M frames is not present (NO in step S1505), then in step S1506, the CPU 115 determines whether there is any block including at least a predetermined number of "Δ determination" frames in the N×N AF frames so as to include at least one of the central M×M frames.

If it is determined that the block including at least the predetermined number of "Δ determination" frames in the N×N AF frames so as to include at least one of the central M×M frames is present (YES in step S1506), the processing proceeds to step S1511. For example, in the example illustrated in FIG. 16A, the predetermined number in step S1506 is 4.

If it is determined that the block including at least the predetermined number of "∘ determination" frames in the N×N AF frames so as to include at least one of the central M×M frames is not present (NO in step S1506), then in step S1507, the CPU 115 determines whether there is any "block" including at least a predetermined number of "∘ determination" frames in the central M×M frames. If it is determined that the "block" including at least the predetermined number of "∘ determination" frames in the central M×M frames is present (YES in step S1507), the processing proceeds to step S1512. For example, in the example illustrated in FIG. 16A, the predetermined number in step S1507 is 5.

If it is determined that the "block" including at least the predetermined number of "∘ determination" frames in the central M×M frames is not present (NO in step S1507), then in step S1508, the CPU 115 determines whether the central frame is the "x determination" frame. If it is determined that the central frame is the "x determination" (YES in step 1508), the processing proceeds to step S1511.

If it is determined that the central frame is not the "x determination" (NO in step 1508), then in step S1509, the CPU 115 determines whether there in any "block" including at least a predetermined number of "Δ or x determination" frames in the central M×M frames.

If it is determined that the "block" including at least the predetermined number of "Δ or x determination" frames in the central M×M frames is present (YES in step S1509), the processing proceeds to step S1511. For example, in the example illustrated in FIG. 16A, the predetermined number in step S1509 is 2.

If it is determined that the "block" including at least the predetermined number of "Δ or x determination" frames in the central M×M frames is not present (NO in step S1509), then in step S1510, the CPU 115 determines whether there is any "block" including at least a predetermined number of "Δ or x determination" frames in all N×N frames so as to include at least one of the central M×M frames.

If it is determined that the "block" including at least the predetermined number of "Δ or x determination" frames in all N×N frames so as to include at least one of the central M×M frames is present (YES in step S1510), the processing proceeds to step S1511. For example, in the example illustrated in FIG. 16A, the predetermined number in step S1510 is 4.

In step S1511, the CPU 115 determines to perform the zone updating and terminates the determination processing of this routine.

If it is determined that the "block" including at least the predetermined number of "Δ or x determination" frames in all N×N frames so as to include at least one of the central M×M frames is not present (NO in step S1510), then the processing proceeds to step S1512. In step S1512, the CPU 115 determines not to perform the zone updating and terminates the determination processing of this routine.

FIG. 16B illustrates a gray "block" determined as the "zone to be updated" in a case where N=5 and M=3.

Figure 17:
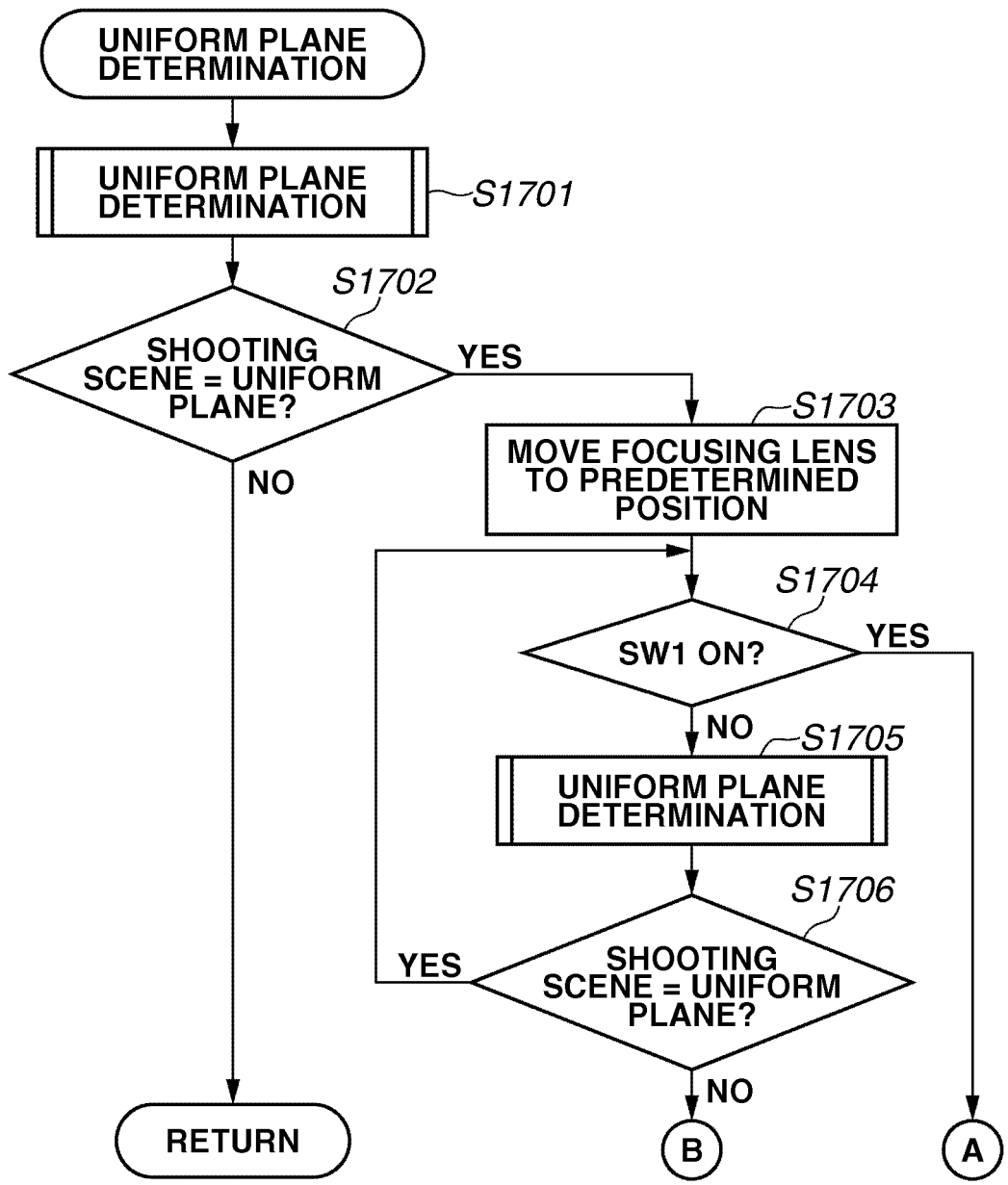
FIG. 17 is a flowchart illustrating a subroutine relating to uniform plane determination processing illustrated in FIG. 8 according to an exemplary embodiment of the present invention.

FIG. 17 is a flowchart illustrating details of the uniform plane determination processing to be performed in step S811 illustrated in FIG. 8. In the context of the present specification, a "uniform plane state" is a state where there is no substantial luminance difference in the image plane, there is no substantial contrast, and, therefore, a peak of the focus evaluation value cannot be obtained by the AF processing.

If the object region identifying AF scan processing in step S208 is repeated every time when the shooting scene is stabilized in the "uniform plane state", the camera may repeat an image plane focus varying operation uselessly and troublesomely. Therefore, in the uniform plane determination processing illustrated in FIG. 17, if the CPU 115 detects any "uniform plane state", the CPU 115 performs an operation for holding the focusing lens 104 at the same position until the "uniform plane state" is no longer detected.

First, in step S1701, the CPU 115 performs uniform plane determination processing according to a below-described procedure. In step S1702, the CPU 115 determines whether the determination result in step S1701 indicates that the shooting scene is a uniform plane. If it is determined that the shooting scene is not a uniform plane (NO in step S1702), the CPU 115 terminates the determination processing of this routine.

If it is determined that the shooting scene is a uniform plane (YES in step S1702), then in step S1703, the CPU 115 causes the AF processing unit 105 to move the focusing lens 104 to a predetermined position. In the present exemplary embodiment, the "predetermined position" is, for example, a hyperfocal distance that includes the point at infinity at a far side of the depth of the field.

In step S1704, the CPU 115 detects the operational state (ON/OFF) of the first switch SW1 that instructs a shooting preparation operation. If it is determined that the first switch SW1 is in the ON state (YES in step S1704), the CPU 115 terminates the processing of this routine and proceeds to step S212.

If it is determined that the first switch SW1 is in the OFF state (NO in step S1704), then in step S1705, the CPU 115 performs below-described uniform plane determination processing. In step S1706, the CPU 115 determines whether the shooting scene is a uniform plane based on a result of the determination in step S1705. If it is determined that the shooting scene is the uniform plane (YES in step S1706), the processing returns to step S1704. If it is determined that the shooting scene is not the uniform plane (NO in step S1706), the CPU 115 terminates the determination processing of this routine and returns to step S201.

As described above, the focusing lens 104 can be held at the same position until the "uniform plane state" is not detected.

Figure 19A:
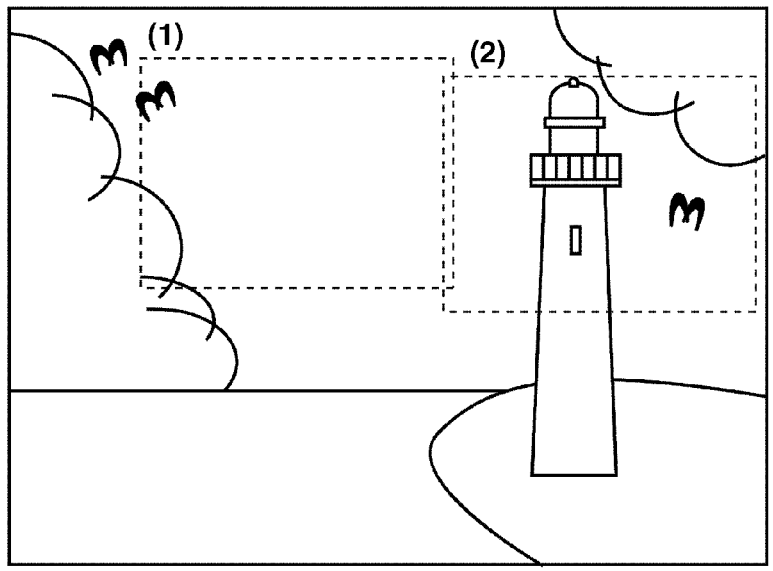
FIGS. 19A and 19B illustrate an example of the uniform plane determination processing to be performed according to the flowchart illustrated in FIG. 17.
Figure 19B:
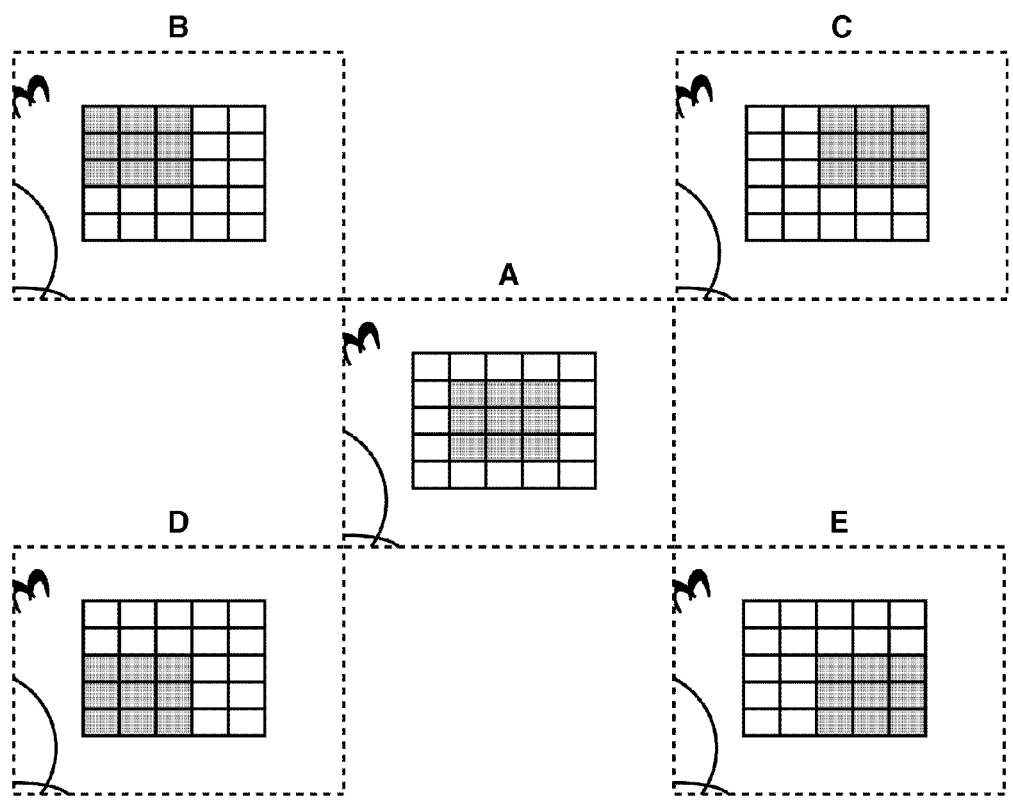

FIG. 18 is a flowchart illustrating details of the uniform plane determination to be performed in step S1701 and step S1705 illustrated in FIG. 17. In the present exemplary embodiment, the CPU 115 detects the "uniform plane state" based on image plane luminance information and the focus evaluation value. FIGS. 19A and 19B illustrate an example of the uniform plane determination processing to be performed according to the flowchart illustrated in FIG. 18. FIG. 19A illustrates a region (1) that is in the "uniform plane state" and a region (2) that is not in the "uniform plane state."

First, in step S1801, the CPU 115 determines whether the AF frame having been set is only one frame. If it is determined that only one AF frame is set (YES in step S1801), the processing proceeds to step S1805.

If it is determined that two or more AF frames have been set (NO in step S1801), then in step S1802, the CPU 115 calculates a "difference in integral luminance value between the central M×M frames and each of the four-corner M×M frames in the entire image plane (i.e., N×N frames)." For example, it is assumed that the frame size is 10%, N=5, and M=3. In a case where the shooting scene is the region (1) of the scene illustrated in FIG. 19A, the integral luminance value of the central M×M frames is an integral luminance value of a gray region in "A" illustrated in FIG. 19B.

The integral luminance value in each of the four-corner M×M frames in the entire image plane (i.e., N×N frames) is an integral luminance value of a gray region in "B", "C", "D", and "E" illustrated in FIG. 19B. When A, B, C, D, and E represent the integral luminance values, absolute values |A-B|, |A-C|, |A-D|, and |A-E| are the difference in integral luminance value between the central M×M frames and each of the four-corner M×M frames in the entire image plane (i.e., N×N frames).

In step S1803, the CPU 115 determines whether there is any "difference in integral luminance value between the central M×M frames and each of the four-corner M×M frames in the entire image plane (i.e., N×N frames)" calculated in step S1802 that is equal to or greater than a predetermined value. If it is determined that there is an integral luminance difference that is equal to or greater than the predetermined value (YES in step S1803), the processing proceeds to step S1807.

If it is determined that there is not any integral luminance difference that is equal to or greater than the predetermined value (NO in step S1803), then step S1804, the CPU 115 calculates a focus evaluation value in each AF frame of the central M×M frames and sets the calculated value as a new focus evaluation value. The calculation method used in step S1804 is, for example, addition.

In step S1805, the CPU 115 determines whether the focus evaluation value is equal to or greater than a predetermined value. If it is determined that the focus evaluation value is equal to or greater than the predetermined value (YES in step S1805), the processing proceeds to step S1807.

If it is determined that the focus evaluation value is less than the predetermined value (NO in step S1805), then in step S1806, the CPU 115 determines that the shooting scene is a "uniform plane" and terminates the determination processing of this routine. In step S1807, the CPU 115 determines that the shooting scene is "not a uniform plane" and terminates the determination processing of this routine.

Through the above-described processing, the CPU can determine the region (1) illustrated in FIG. 19A as "uniform plane" and the region (2) illustrated in FIG. 19A as "non-uniform plane."

<Focusing Driving Processing>

FIG. 20 is a flowchart illustrating details of the focusing driving processing to be performed in step S813 illustrated in FIG. 8.

First, in step S2001, the CPU 115 determines whether the main object region has been identified. If it is determined that the main object region has been identified (YES in step S2001), then in step S2002, the CPU 115 drives the focusing lens 104 to the closest position in the selected AF frame and terminates the processing of this routine.

If it is determined that the main object region has not been identified (NO in step S2001), then in step S2003, the CPU 115 determines whether there is any "○ determination" frame in the central M×M frames. If the "○ determination" frame is present in the central M×M frames (YES in step S2003), then in step S2004, the CPU 115 drives the focusing lens 104 to the closest position of the "○ determination" frame in the central M×M frames and terminates the processing of this routine.

If the "○ determination" frame is not present in the central M×M frames (NO in step S2003), then in step S2005, the CPU 115 moves the focusing lens 104 to a predetermined position (fixed point) stored beforehand and terminates the processing of this routine. In the present exemplary embodiment, the fixed point can be set, for example, at a position corresponding to the distance where the probability of presence of the object to be photographed is very high.

FIG. 21 is a flowchart illustrating details of the continuous AF processing to be performed in step S209 illustrated in FIG. 2. First, in step S2101, the CPU 115 sets the in-focus degree determination flag to "TRUE." In step S2102, the CPU 115 acquires a focus evaluation value in each AF frame having been set.

In step S2103, the CPU 115 determines whether the AF frame having been set is only one frame. If it is determined that the AF frame having been set is only one frame (YES in step S2103), the processing proceeds to step S2105. If it is determined that the AF frame having been set is not only one frame (NO in step S2103), then in step S2104, the CPU 115 calculates an evaluation value based on the focus evaluation value of the AF frame having been selected as the main object region.

Further, the CPU 115 sets the calculated evaluation value as a new focus evaluation value to be used in step S2105 and the subsequent steps. Thus, even when the main object region has changed in the image plane due to a change of the shooting scene, the CPU 115 can calculate a focus evaluation value of the main object region in the image plane.

In step S2105, the CPU 115 calculates an in-focus degree based on the focus evaluation value. In the present exemplary embodiment, the in-focus degree determined by the CPU 115 is selected among three ranks of "high", "middle", and "low", based on the focus evaluation value.

In step S2106, the CPU 115 detects the operational state (ON/OFF) of the first switch SW1 that instructs a shooting preparation operation. If it is determined that the first switch SW1 is in the ON state (YES in step S2106), the CPU 115 terminates the processing of this routine and proceeds to step S213.

If it is determined that the first switch SW1 is in the OFF state (NO in step S2106), then in step S2107, the CPU 115 performs the above-described scene change determination.

In step S2108, the CPU 115 determines whether the peak detection flag is "TRUE." If it is determined that the peak detection flag is "TRUE" (YES in step S2108), the processing proceeds to step S2125. If it is determined that the peak detection flag is "FALSE" (NO in step S2108), then in step S2109, the CPU 115 acquires the present position of the focusing lens 104. In step S2110, the CPU 115 adds 1 to an acquisition counter.

The acquisition counter can be used to count acquisition of the focus evaluation value and acquisition of the present position of the focusing lens 104. In the present exemplary embodiment, the acquisition counter is set to 0 beforehand in an initialization operation (not illustrated).

In step S2111, the CPU 115 determines whether the acquisition counter value is 1. If it is determined that the acquisition counter value is 1 (YES in step S2111), the processing proceeds to step S2114.

If it is determined that the acquisition counter value is not 1 (NO in step S2111), then in step S2112, the CPU 115 determines whether a "present focus evaluation value" is greater than a "previous focus evaluation value."

If it is determined that the present focus evaluation value is greater than the previous focus evaluation value (YES in step S2112), then in step S2113, the CPU 115 adds 1 to an increment counter. If it is determined that the present focus evaluation value is not greater than the previous focus evaluation value (NO in step S2112), the processing proceeds to step S2120.

In step S2114, the CPU 115 stores the present focus evaluation value as a maximum value of the focus evaluation value in a calculation memory (not illustrated) provided in the CPU 115. In step S2115, the CPU 115 stores the present position of the focusing lens 104 as a peak position of the focus evaluation value in the calculation memory (not illustrated) provided in the CPU 115.

In step S2116, the CPU 115 stores the present focus evaluation value as the previous focus evaluation value in the calculation memory (not illustrated) provided in the CPU 115. In step S2117, the CPU 115 determines whether the present position of the focusing lens 104 coincides with an edge of a moving range. If it is determined that the present position of the focusing lens 104 coincides with the edge of the moving range (YES in step S2117), then in step S2118, the CPU 115 reverses the moving direction of the focusing lens 104.

If it is determined that the present position of the focusing lens 104 does not coincide with the edge of the moving range (NO in step S2117), then in step S2119, the CPU 115 moves the focusing lens 104 by a predetermined amount.

In step S2120, the CPU 115 determines whether a difference "maximum focus evaluation value—present focus evaluation value" is greater than a predetermined amount. If it is determined that the difference "maximum focus evaluation value—present focus evaluation value" is not greater than the predetermined amount (NO in step S2120), the processing proceeds to step S2116.

In the present exemplary embodiment, when the difference "maximum focus evaluation value—present focus evaluation value" is greater than the predetermined amount, namely when the reduction of the focus evaluation value from the maximum value exceeds the predetermined amount, the CPU 115 determines the maximum value as a value at the focus peak position.

If it is determined that the difference "maximum focus evaluation value—present focus evaluation value" is greater than the predetermined amount (YES in step S2120), then in step S2121, the CPU 115 determines whether the increment counter value is greater than 0. If it is determined that the increment counter value is not greater than 0 (NO in step S2121), the processing proceeds to step S2116.

If it is determined that the increment counter value is greater than 0 (YES in step S2121), then in step S2122, the CPU 115 moves the focusing lens 104 to the peak position (i.e., the maximum focus evaluation value) stored in step S2115. In step S2123, the CPU 115 sets the peak detection flag to "TRUE." In step S2124, the CPU 115 sets the acquisition counter to 0.

In step S2125, the CPU 115 determines whether a variation of the present focus evaluation value relative to the maximum focus evaluation value is equal to or greater than a predetermined rate. If it is determined that the variation is less than the predetermined rate (NO in step S2125), then in step S2126, the CPU 115 holds the focusing lens 104 at the same position.

If it is determined that the variation is equal to or greater than the predetermined rate (YES in step S2125), then in step S2127, to newly acquire a focusing lens position where the focus evaluation value is maximized, the CPU 115 sets the peak detection flag to "FALSE" and resets the maximum focus evaluation value and the peak position. In step S2128, the CPU 115 resets the increment counter.

As described above, in the continuous AF operation, the camera drives the focusing lens 104 so that the main object can be constantly kept in the in-focus state.

Figure 22:
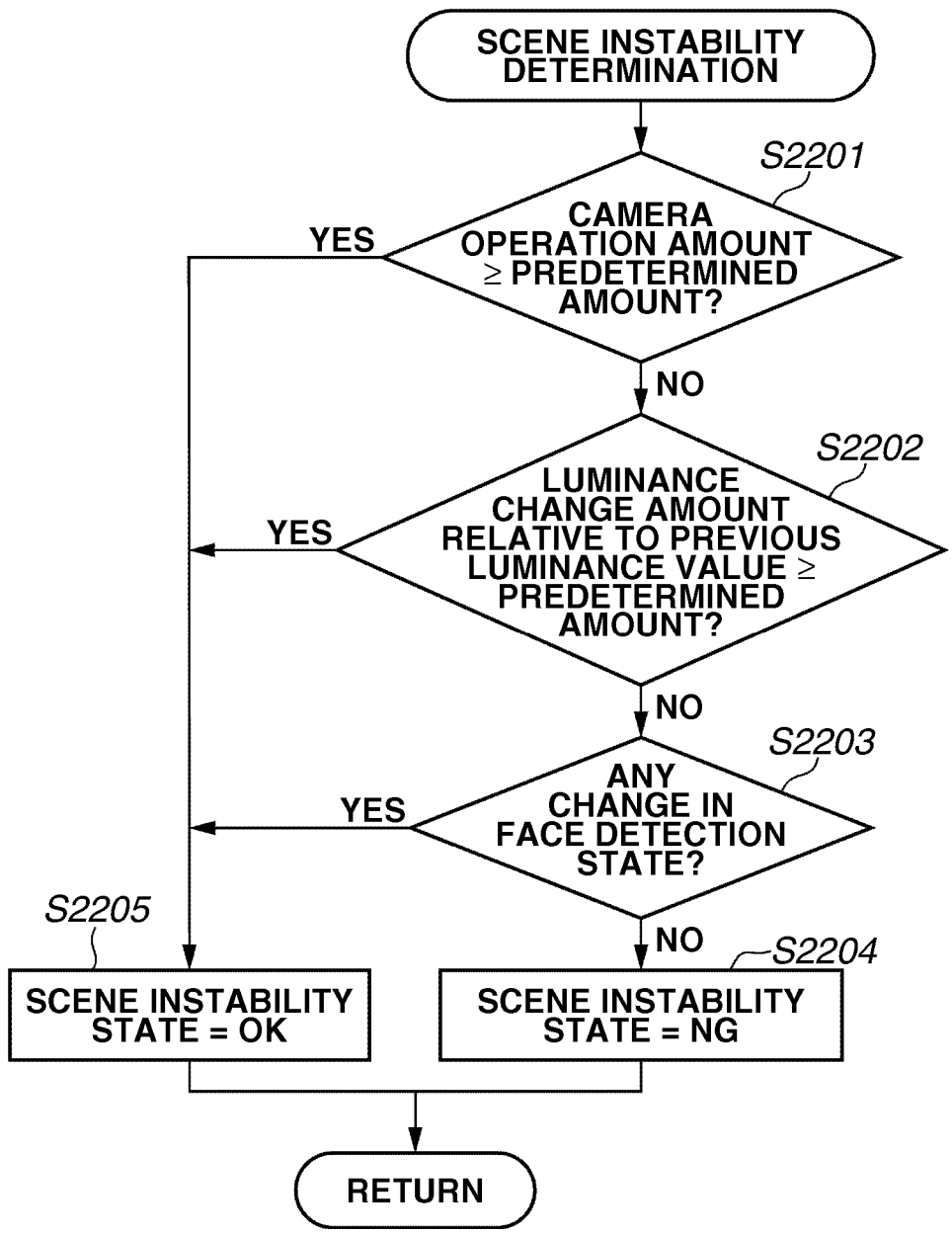
FIG. 22 is a flowchart illustrating a subroutine relating to scene instability determination processing illustrated in FIG. 2 according to an exemplary embodiment of the present invention.

FIG. 22 is a flowchart illustrating details of the scene instability determination to be performed in step S210 illustrated in FIG. 2. In step S2201, the CPU 115 determines whether the camera operation amount detected by the angular speed sensor unit 125 is equal to or greater than a predetermined amount. If it is determined that the detected camera operation amount is equal to or greater than the predetermined amount (YES in step S2201), the processing proceeds to step S2205.

If it is determined that the detected camera operation amount is less than the predetermined amount (NO in step S2201), then in step S2202, the CPU 115 determines whether a luminance change amount relative to a previous luminance value is equal to or greater than a predetermined amount. If it is determined that the luminance change amount is equal to or greater than the predetermined amount (YES in step S2202), the processing proceeds to step S2205.

If it is determined that the luminance change amount is less than the predetermined amount (NO in step S2202), then in step S2203, the CPU 115 determines whether there is any change in the face detection state detected by the face detection module 123. If it is determined that the face detection state has changed (YES in step S2203), the processing proceeds to step S2205.

If it is determined that the face detection state has not changed (NO in step S2203), the processing proceeds to step S2204.

In the context of the present specification, the face detection state indicates a state where a face has been detected. More specifically, if no face is detected in the present scene instability determination although a face was detected in the previous scene instability determination, the CPU 115 determines that the face detection state has changed.

In step S2204, the CPU 115 determines that the shooting scene has not changed and terminates the processing of this routine. In step S2205, the CPU 115 determines that the shooting scene has changed and terminates the processing of this routine.

Figure 23:
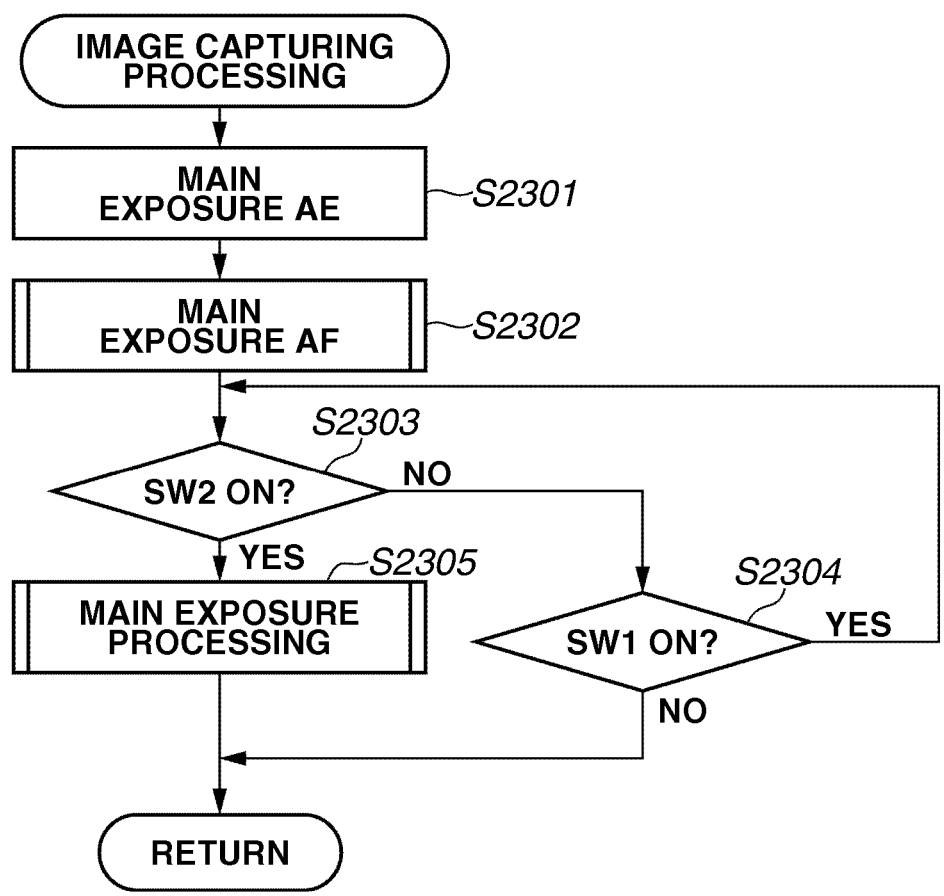
FIG. 23 is a flowchart illustrating a subroutine relating to image capturing processing illustrated in FIG. 2 according to an exemplary embodiment of the present invention.

FIG. 23 is a flowchart illustrating details of the image capturing processing to be performed in step S213 illustrated in FIG. 2.

First, in step S2301, the AE processing unit 103 performs main exposure AE processing. In step S2302, the CPU 115 performs main exposure AF processing according to a below-described procedure. In step S2303, the CPU 115 detects the operational state (ON/OFF) of the second switch SW2.

If it is determined that the second switch SW2 is in the OFF state (NO in step S2303), then in step S2304, the CPU 115 detects the operational state (ON/OFF) of the first switch SW1 that instructs a shooting preparation operation. If it is determined that the first switch SW1 is in the ON state (YES in step S2304), the processing returns to step S2303. If it is determined that the first switch SW1 is in the OFF state (NO in step S2304), the CPU 115 terminates the processing of this routine.

If it is determined that the second switch SW2 is in the ON state (YES in step S2303), then in step S2305, the CPU 115 performs main exposure processing according to a below-described procedure and terminates the processing of this routine.

Figure 24:
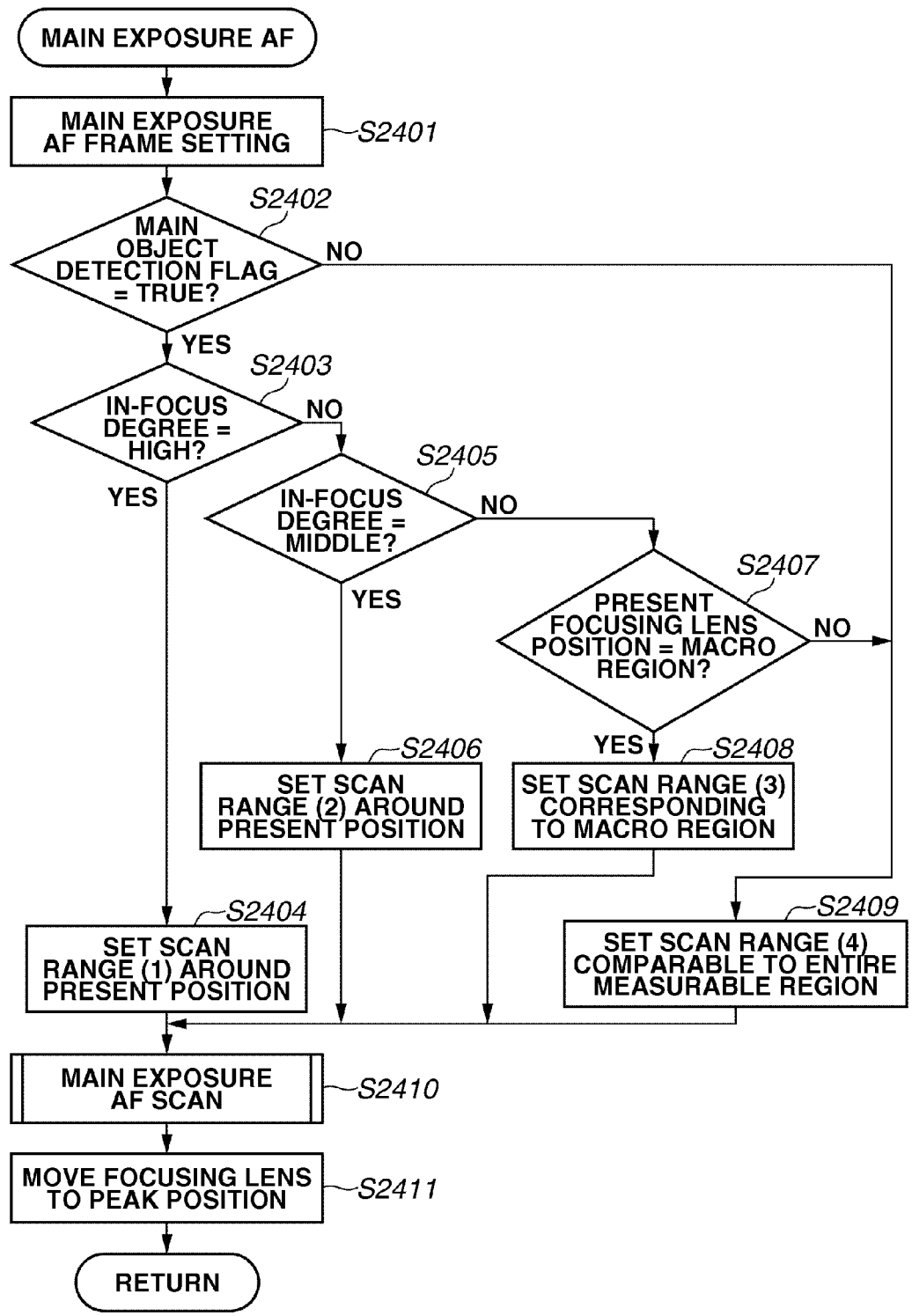
FIG. 24 is a flowchart illustrating a subroutine relating to main exposure AF processing illustrated in FIG. 23 according to an exemplary embodiment of the present invention.

FIG. 24 is a flowchart illustrating details of the main exposure AF processing to be performed in step S2302 illustrated in FIG. 23.

First, in step S2401, the CPU 115 performs AF frame setting for the main exposure operation. The AF frame setting for the main exposure operation may be setting of only one frame having a predetermined size positioned at a central region or setting of a plurality of frames (e.g., N×N frames).

In step S2402, the CPU 115 determines whether a main object detection flag is "TRUE." If it is determined that the main object detection flag is "FALSE" (NO in step S2402), the processing proceeds to step S2409.

If it is determined that the main object detection flag is "TRUE" (YES in step S2402), then in step S2403, the CPU 115 determines whether the in-focus degree calculated in step S2105 is "high." If it is determined that the calculated in-focus degree is "high" (YES in step S2403), then in step S2404, the CPU 115 sets a first scan range around the present position of the focusing lens 104.

In this case, the first scan range set by the CPU 115 is a narrow range according to a determination result that the main object is in the in-focus state as a result of the continuous AF operation, i.e., the focusing lens is positioned in the vicinity of the in-focus position where the focus evaluation value has a peak value.

If it is determined that the calculated in-focus degree is not "high" (NO in step S2403), then in step S2405, the CPU 115 determines whether the in-focus degree calculated in step S2105 is "middle." If it is determined that the in-focus degree is "middle" (YES in step S2405), then in step S2406, the CPU 115 sets a second scan range around the present position of the focusing lens 104.

In this case, the second scan range set by the CPU 115 is a narrow range that is wider than the first scan range according to a determination result that the in-focus degree is not in the "high" state although the focusing lens is positioned in the vicinity of the in-focus position according to the continuous AF operation.

If it is determined that the in-focus degree is not "middle" (NO in step S2405), then in step S2407, the CPU 115 determines whether the present position of the focusing lens 104 is in a macro region. If it is determined that the present position of the focusing lens 104 is in the macro region (YES in step S2407), then in step S2408, the CPU 115 sets a third scan range that corresponds to the macro region having been stored beforehand.

If it is determined that the present position of the focusing lens 104 is not in the macro region (NO in step S2407), then in step S2409, the CPU 115 sets a fourth scan range that is comparable to the entire distance measurable region having been stored beforehand.

In step S2410, the CPU 115 performs AF scan processing for the main exposure operation according to a below-described procedure. In step S2411, the CPU 115 moves the focusing lens 104 to a peak position to be calculated in step S2506 illustrated in FIG. 25.

Figure 25:
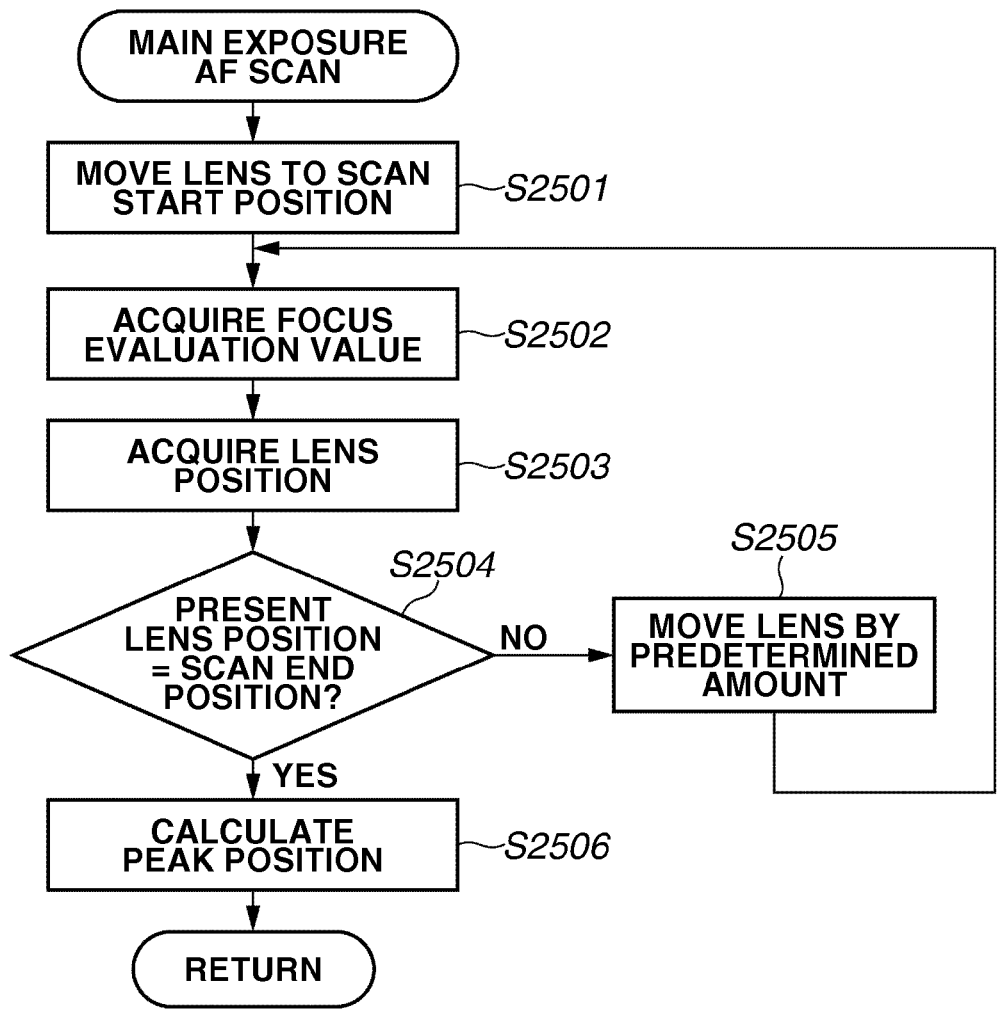
FIG. 25 is a flowchart illustrating a subroutine relating to main exposure AF scan processing illustrated in FIG. 24 according to an exemplary embodiment of the present invention.

FIG. 25 is a flowchart illustrating details of the AF scan processing for the main exposure operation to be performed in step S2410 illustrated in FIG. 24.

First, in step S2501, the CPU 115 moves the focusing lens 104 to the scan start position. In this case, the scan start position is an edge position of the scan range having been set in any one of steps S2404, S2406, S2408, and S2409 illustrated in FIG. 24.

In step S2502, the A/D conversion unit 109 converts an analog video signal read by the image sensor 108 into a digital signal and the image processing unit 110 extracts a high-frequency component of a luminance signal from the output signal. The CPU 115 stores the extracted high-frequency component as a focus evaluation value.

In step S2503, the CPU 115 acquires the present position of the focusing lens 104 and stores the acquired position data. In step S2504, the CPU 115 determines whether the present position of the focusing lens 104 coincides with the scan end position.

If it is determined that the present position of the focusing lens 104 does not coincide with the scan end position (NO in step S2504), then in step S2505, the CPU 115 moves the focusing lens 104 toward the scan end direction by a predetermined amount. Then, the processing returns to step S2502.

If it is determined that the present position of the focusing lens 104 coincides with the scan end position (YES in step S2504), then in step S2506, the CPU 115 calculates a peak position of the focus evaluation value based on the focus evaluation value stored in step S2502 and the corresponding lens position.

In calculating the peak position of the focus evaluation value, in a case where a plurality of AF frames are set, the CPU 115 can perform calculations based on the closest peak position in the main object region determined by the main object region determination processing described in FIG. 12. Further, the CPU 115 can use another determination method for the calculation of the peak position.

Figure 26:
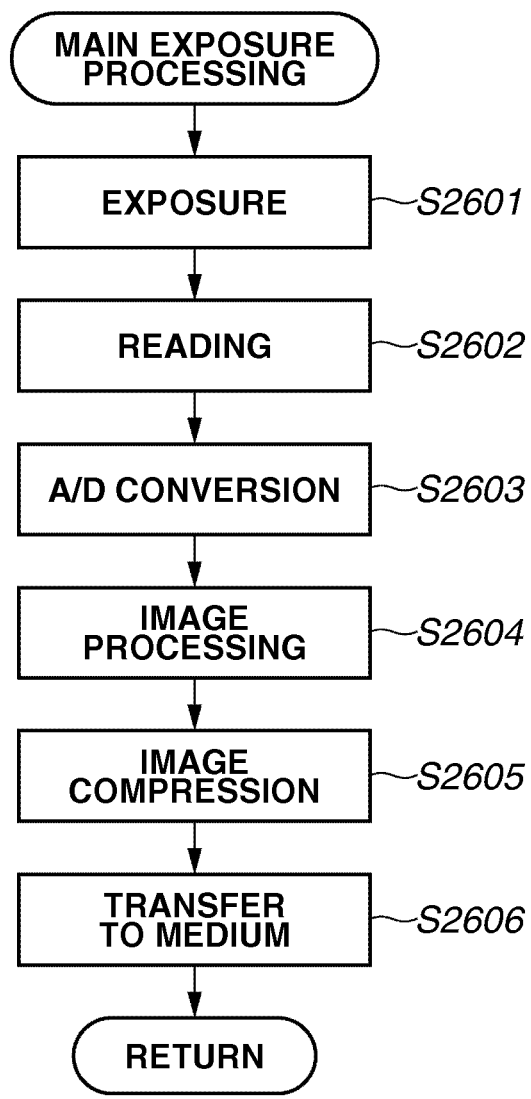
FIG. 26 is a flowchart illustrating a subroutine relating to main exposure processing illustrated in FIG. 23 according to an exemplary embodiment of the present invention.

FIG. 26 is a flowchart illustrating details of the main exposure processing to be performed in step S2305 illustrated in FIG. 23.

In step S2601, the CPU 115 causes the image sensor 108 to be exposed to light. In step S2602, the CPU 115 reads data stored in the image sensor 108. In step S2603, the CPU 115 causes the A/D conversion unit 109 to convert an analog signal read by the image sensor 108 into a digital signal.

In step S2604, the CPU 115 causes the image processing unit 110 to perform various processing on the digital signal generated from the A/D conversion unit 109. In step S2605, the CPU 115 compresses the image having been processed in step S2604 according to a JPEG format or the like. In step S2606, the CPU 115 transfers the image data compressed in step S2605 to the image recording unit 114 that records the transferred image data.

As described above, before instructing a shooting preparation operation, the present exemplary embodiment can identify a main object region and can continuously keep it in the in-focus state. Therefore, the camera can quickly focus on the main object after completing the shooting preparation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-034032 filed Feb. 17, 2009, which is hereby incorporated by reference herein in its entirety.

What is claimed is:

1. An apparatus comprising:
   a reception unit configured to receive an instruction;
   an imaging unit configured to capture an image of an object, which is input via a focusing lens, and to output image data;
   a setting unit configured to set a plurality of focus detection regions in the image data to detect a focusing state of the focusing lens;
   a focus adjustment unit configured to detect a focus signal in each of the focus detection regions while moving the focusing lens, and configured to move the focusing lens based on the focus signal in each of the focus detection regions and a focusing lens position; and
   a determination unit configured to determine whether a shooting scene is changed based on a result of comparison of first image data outputted from the imaging unit with second image data outputted later than the first image data from the imaging unit,
   wherein the focus adjustment unit is configured to, before receiving the instruction by the reception unit, perform a scan operation that sequentially detects each of focus signals based on image data in each plurality of focus detection regions set by the setting unit with movement of the focusing lens in a moving range, calculate an in-focus position in each of the focus detection regions based on the focus signals, calculate a number of focus detection regions in focus at each of focusing lens positions based on the calculated in-focus position in each of the focus detection regions, and determine a focusing lens target position based on at least the number of focus detection regions in focus, in a case where the determination unit determines that the shooting scene is changed, perform the scan operation and redetect a focus detection region where an in-focus position is obtained by performing the scan operation from the plurality of focus detection regions set by the setting unit, and after the instruction is received, perform a focus adjustment operation for the focusing lens based on the focus lens target position determined before receiving the instruction by the reception unit.

2. The apparatus according to claim 1, wherein the focus adjustment unit is configured to determine a moving direction along which the focusing lens is next moved based on a focus signal having been detected before the focusing lens is moved by a predetermined amount and a focus signal having been detected after the focusing lens has been moved before receiving the instruction by the reception unit and after the scan operation is performed.

3. The apparatus according to claim 2, wherein the focus adjustment unit is configured to move the focusing lens to a peak position of the focus signal by causing the focusing lens to repetitively move by the predetermined amount.

4. The apparatus according to claim 1, wherein an object region is identified when a power source is turned on.

5. The apparatus according to claim 1, wherein the determination unit determines whether a shooting scene is changed based on a result of comparison of a luminance value of the first image data with a luminance value of second image data.

6. The apparatus according to claim 1 further comprising a face detection unit configured to detect a face in the image data outputted from the imaging unit,
wherein the determination unit determines whether a shooting scene is changed based on a result of face detection of the first image data with a result of face detection of the second image data.

7. A method comprising:
receiving an instruction;
capturing an image of an object, which is input via a focusing lens, and outputting image data;
setting a plurality of focus detection regions in the image to detect a focusing state of the focusing lens;
detecting a focus signal in each of the focus detection regions while moving the focusing lens, storing the focus signal in each of the focus detection regions in association with a focusing lens position, and moving the focusing lens based on the stored information;
determining whether a shooting scene is changed based on a result of comparison of first image data outputted from the imaging unit with second image data outputted later than the first image data from the imaging unit; and
before receiving the instruction, performing a scan operation that sequentially detects each of focus signals based on image data in each plurality of focus detection regions with movement of the focusing lens in a moving range, calculating an in-focus position in each of the focus detection regions based on the focus signals, calculating a number of focus detection regions in focus at each of focusing lens positions based on the calculated in-focus position in each of the focus detection regions, and determining a focusing lens target position based on at least the number of focus detection regions in focus, in a case where it is determined that the shooting scene is changed, performing the scan operation and redetecting a focus detection region where an in-focus position is obtained by performing the scan operation from the plurality of set focus detection regions, and, after receiving the instruction, controlling the moving of the focusing lens based on the focus lens target position determined before receiving the instruction by the reception unit.

8. The method according to claim 7, further comprising determining a moving direction along which the focusing lens is next moved based on a focus signal having been detected before the focusing lens is moved by a predetermined amount and a focus signal having been detected after the focusing lens has been moved before receiving the instruction and after the scan operation is performed.

9. The method according to claim 8, further comprising moving the focusing lens to a peak position of the focus signal by causing the focusing lens to repetitively move by the predetermined amount.

10. The method according to claim 7, wherein an object region is identified when a power source is turned on.

11. An apparatus comprising:
a reception unit configured to receive an instruction;
an imaging unit configured to capture an image of an object, which is input via a focusing lens, and to output image data;
a setting unit configured to set a plurality of focus detection regions in the image data to detect a focusing state of the focusing lens;
a focus adjustment unit configured to detect a focus signal in each of the set focus detection regions while moving the focusing lens, and configured to move the focusing lens based on the focus signal in each of the focus detection regions and a focusing lens position; and
a determination unit configured to determine whether a shooting scene is changed based on a result of comparison of first image data outputted from the imaging unit with second image data outputted later than the first image data from the imaging unit,
wherein the focus adjustment unit is configured to, before receiving the instruction by the reception unit, perform a scan operation that sequentially detects focus signals based on images in the plurality of focus detection region set by the setting unit with movement of the focusing lens in a moving range, performs grouping of the focus detection region where the focus position was obtained by the scan operation from the plurality of focus detection region set by the setting unit, detect an in-focus position of the focusing lens corresponding to the object region to be in-focused which is determined based on at least one of the numbers of focus detection regions comprising the grouped focus detection regions and the position of the grouped focus detection regions, in a case where the determination unit determines that the shooting scene is changed, perform the scan operation and redetect a focus detection region where an in-focus position is obtained by performing the scan operation from the plurality of focus detection regions set by the setting unit, and after the instruction is received, control the moving of the focusing lens based on the detection result before the instruction is received.

12. A method comprising:

receiving an instruction;

capturing an image of an object, which is input via a focusing lens, and outputting image data;

setting a plurality of focus detection regions in the image data to detect a focusing state of the focusing lens;

detecting a focus signal in each of the focus detection regions while moving the focusing lens, storing the focus signal in each of the focus detection regions in association with a focusing lens position, and moving the focusing lens based on the stored information;

determining whether a shooting scene is changed based on a result of comparison of first image data outputted from the imaging unit with second image data outputted later than the first image data from the imaging unit; and before receiving the instruction, performing a scan operation that sequentially detects each of focus signals based on image data in each plurality of focus detection regions with movement of the focusing lens in a moving range, grouping of the focus detection regions where the focus position was obtained by the scan operation from the plurality of focus detection region, detecting in-focus position of the focusing lens corresponding to the object region to be in-focused which is determined based on at least one of the numbers of focus detection regions comprising the grouped focus detection regions and the position of the grouped focus detection regions, in a case where it is determined that the shooting scene is changed, performing the scan operation and redetecting a focus detection region where an in-focus position is obtained by performing the scan operation from the plurality of set focus detection regions, and after receiving the instruction, controlling the moving of the focusing lens based on the detection result.

13. The apparatus according to claim 11, wherein the determination unit determines whether a shooting scene is changed based on a result of comparison of a luminance value of the first image data with a luminance value of second image data.

14. The apparatus according to claim 11 further comprising a face detection unit configured to detect a face in the image data outputted from the imaging unit, wherein the determination unit determines whether a shooting scene is changed based on a result of face detection of the first image data with a result of face detection of the second image data.

* * * * *